US012657183B2

(12) United States Patent
Agrawal

(10) Patent No.: US 12,657,183 B2
(45) Date of Patent: Jun. 16, 2026

(54) RECONFIGURATION OF BLOCK ITEM HIERARCHY IN RESPONSE TO MODIFICATION REQUESTS

(71) Applicant: Notion Labs, Inc., San Francisco, CA (US)

(72) Inventor: Nishad Agrawal, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 18 days.

(21) Appl. No.: 18/627,312

(22) Filed: Apr. 4, 2024

(65) Prior Publication Data

US 2025/0315426 A1 Oct. 9, 2025

(51) Int. Cl.
*G06F 16/23* (2019.01)
*G06F 16/28* (2019.01)
*G06F 21/62* (2013.01)

(52) U.S. Cl.
CPC ........ *G06F 16/2379* (2019.01); *G06F 16/282* (2019.01); *G06F 21/6218* (2013.01)

(58) Field of Classification Search
CPC . G06F 16/2379; G06F 16/282; G06F 21/6218
See application file for complete search history.

(56) References Cited

U.S. PATENT DOCUMENTS

| | | | | |
|---|---|---|---|---|
| 2003/0004952 A1* | 1/2003 | Nixon | ................ | G05B 19/0426 |
| 2005/0114315 A1* | 5/2005 | Tanner | .................... | H04L 41/22 |
| 2005/0132304 A1* | 6/2005 | Guido | ................... | G06F 16/904 |
| | | | | 715/854 |
| 2009/0132965 A1* | 5/2009 | Shimizu | ................ | G06F 3/0482 |
| | | | | 715/853 |
| 2012/0084708 A1* | 4/2012 | Upadhyaya | ........... | G06F 40/177 |
| | | | | 715/781 |
| 2016/0266738 A1* | 9/2016 | Martello | ................... | G06F 8/34 |
| 2024/0428337 A1* | 12/2024 | Decanini | ................ | G06Q 40/06 |

* cited by examiner

*Primary Examiner* — Viet D Vu
(74) *Attorney, Agent, or Firm* — Perkins Coie LLP; Alberto Araiza

(57) ABSTRACT

Systems and methods for modifying block items in a hierarchical structure are disclosed herein. The system can receive a request to modify a first block item. The system can query the system for information of displayed block items. The system can receive a set of identifiers of the displayed block items, relational information, and privacy information. The system can determine an indication of displayed subordinate block items associated with the first block item. The system can use the indication of the displayed subordinate block items to query a block database to obtain non-displayed subordinate block items. The system can modify the block database in accordance with the instruction, the displayed subordinate block items, and the non-displayed subordinate block items. The system can determine updated displayed block items using the modified block database. The system can communicate an indication of the updated displayed block items to the client device.

17 Claims, 12 Drawing Sheets

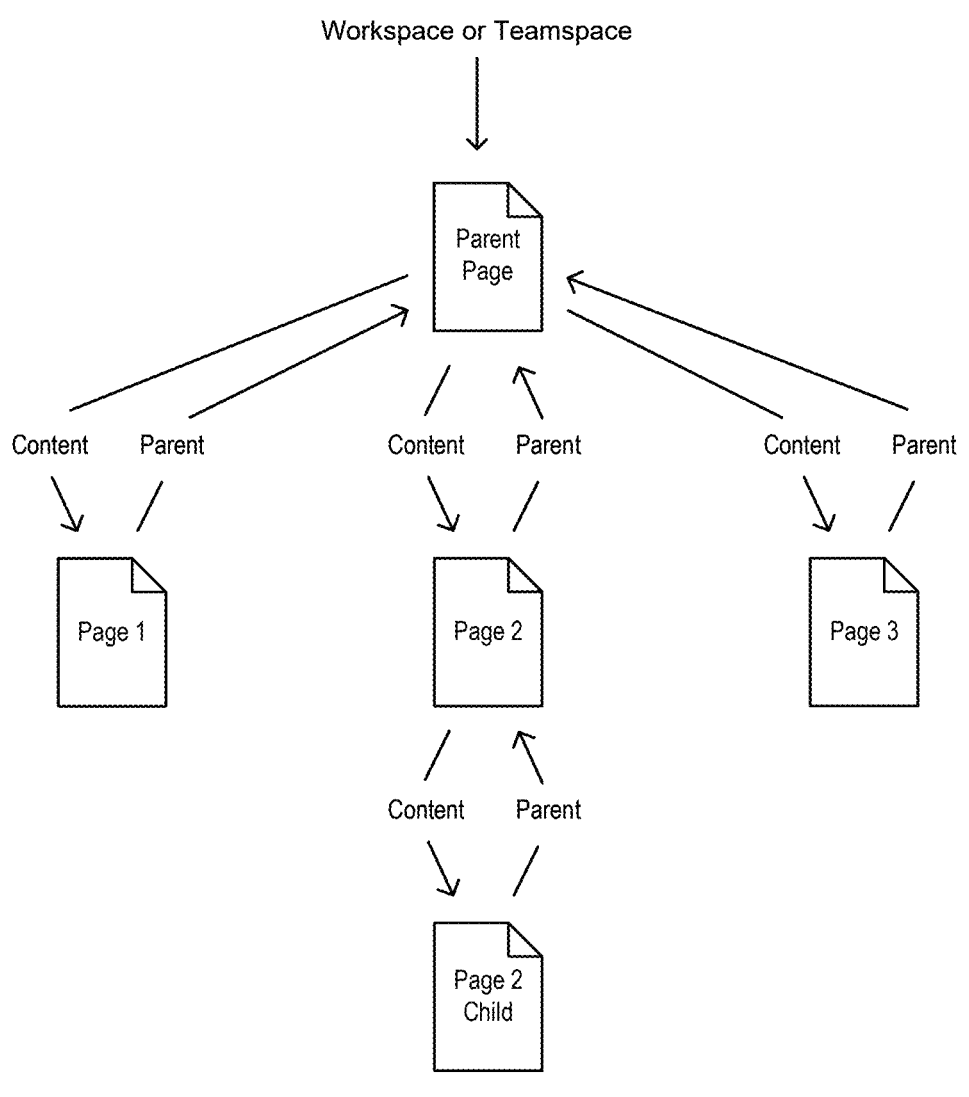
FIG. 3

400

Sub-items

402    ⊞ Table ⌄

Aa Name                                    ⊹

410-1 ⟶ ▾ One

A ⟋ 412-1

B ⟋ 412-2

C ⟋ 412-3

⊹ New sub-item 410-2 ⟶ ▸ Two 410-3 ⟶ ▸ Three

⊹ New

404    ☰ List ⌄

▾ 🗎 One

🗎 A

🗎 B

🗎 C

⊹ New sub-item

▸ 🗎 Two

▸ 🗎 Three

⊹ New

406    ▦ Timeline ⌄

April 2023              Month ⌄  ‹ Today ›

⁷   ¹   ²   ³   ⁴   ⁵   ⁶   ⁷   ⁸

▾ One

A

B

C

▸ Two

▸ Three

⊹ New

408    ▥ Board ⌄

🔒 No Parent Item  3                      ⊹

One

Two

Three

⊹ New

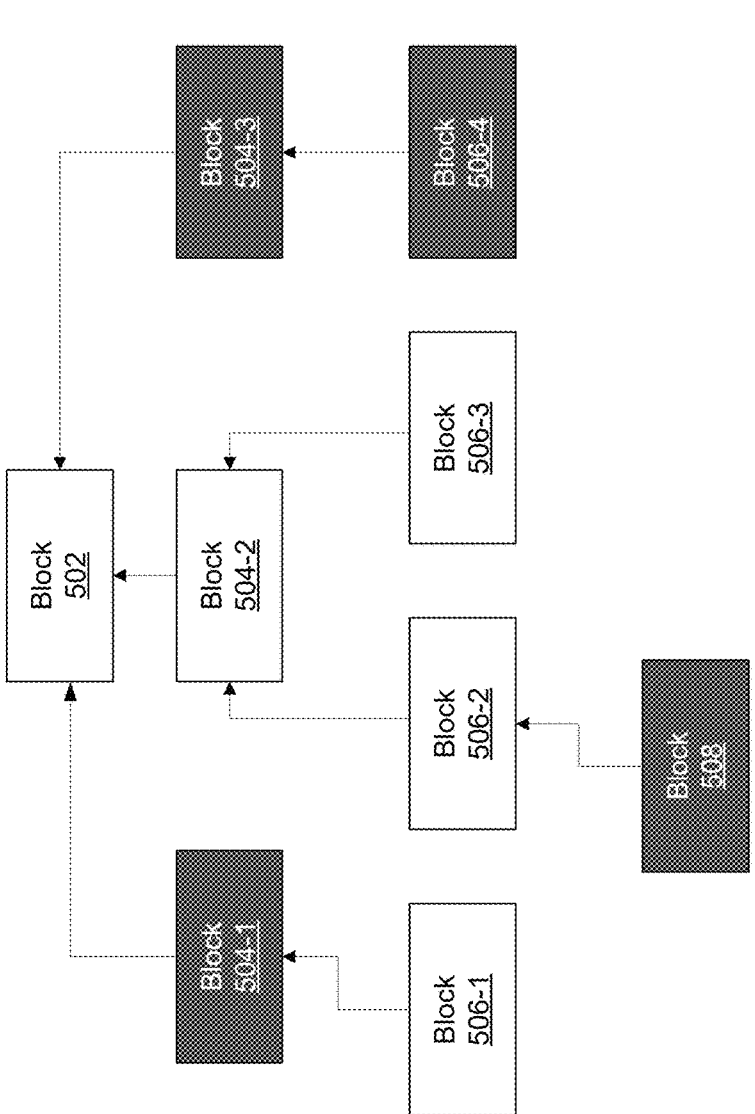
*FIG. 5*

600

| Block Identifier 606 | Block 1 | |
| :---: | :---: | :---: |

| Preference 602 | Value 604 |
| :---: | :---: |
| Display | Table View<br>Subordinate block 1 is hidden<br>Subordinate block 2 is displayed |
| Access Permission | Workspace 1; Workspace 2 |
| Modification | Duplication: Generate new block<br>Deletion: Retain child blocks<br>Move: Retain child-parent relations |
| Inheritance | Root block inherits parent block properties.<br>Child blocks do not inherit parent block properties |

*FIG. 6*

| Un-Linked/Linked Block Type 802 | Un-Linked Block Retention Preferences 804 | Linked Block Inheritance Preferences 806 |
|---|---|---|
| Page | Retain: Title, Tags, Date | Update: Description, Files, Sub-items |
| Task | Retain: Title | Update: Tags, Date, Description, Files, Sub-items |
| Event | Retain: N/A | Update: Title, Tags, Date, Description, Files, Sub-items |
| File | Retain: Title, Tags | Update: Date, Description, Files, Sub-items |

*FIG. 8*

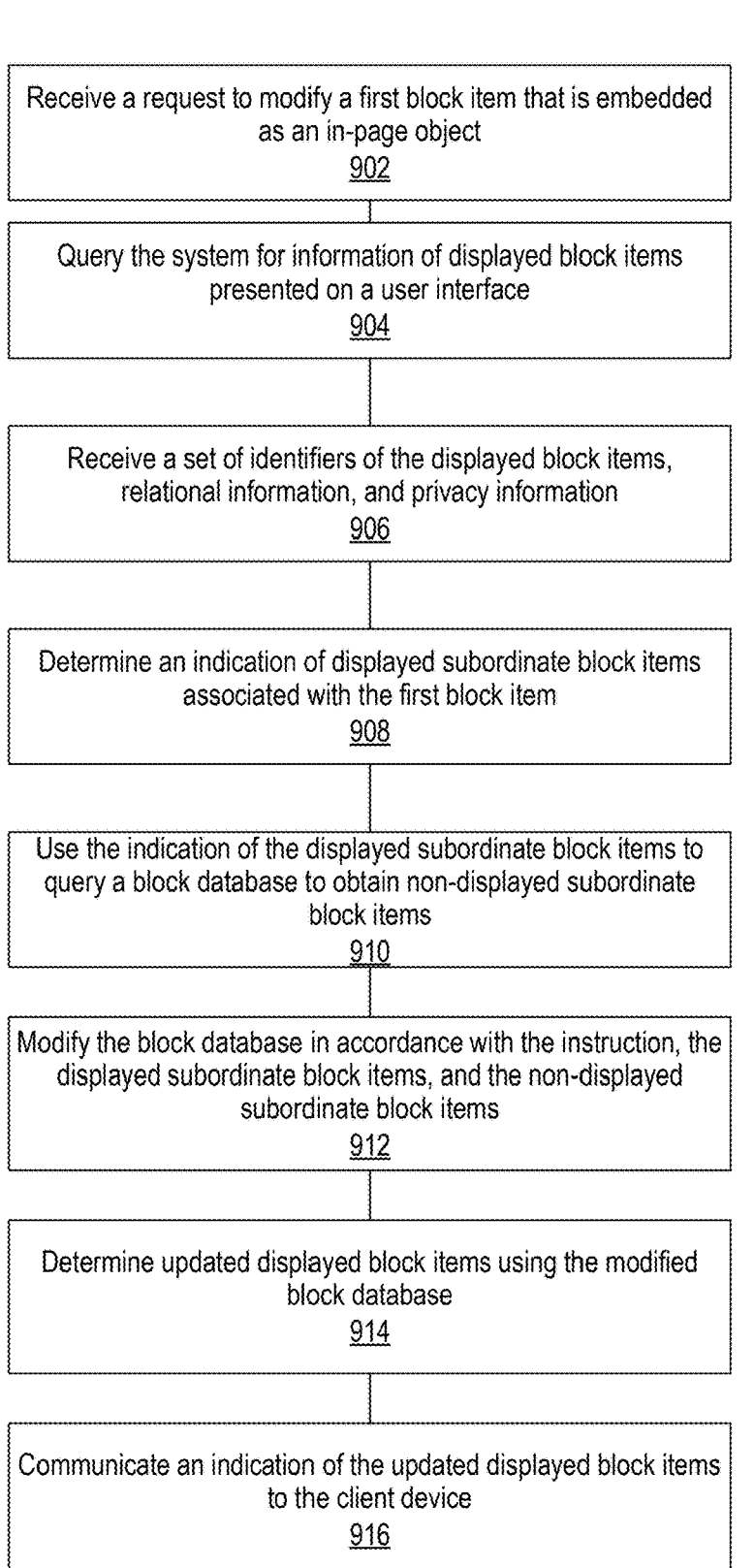

900

Receive a request to modify a first block item that is embedded as an in-page object
902

Query the system for information of displayed block items presented on a user interface
904

Receive a set of identifiers of the displayed block items, relational information, and privacy information
906

Determine an indication of displayed subordinate block items associated with the first block item
908

Use the indication of the displayed subordinate block items to query a block database to obtain non-displayed subordinate block items
910

Modify the block database in accordance with the instruction, the displayed subordinate block items, and the non-displayed subordinate block items
912

Determine updated displayed block items using the modified block database
914

Communicate an indication of the updated displayed block items to the client device
916

*FIG. 9*

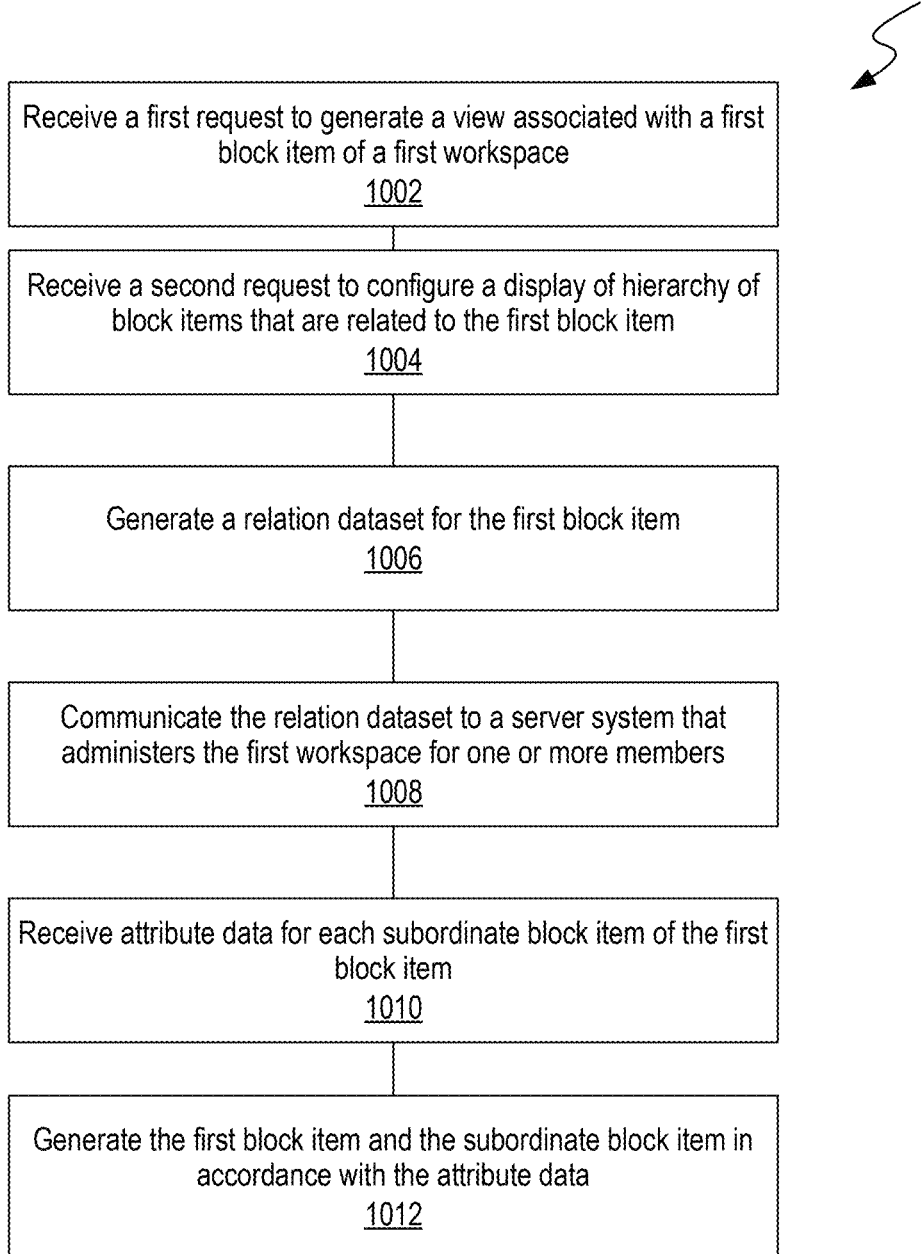

1000

Receive a first request to generate a view associated with a first block item of a first workspace
1002

Receive a second request to configure a display of hierarchy of block items that are related to the first block item
1004

Generate a relation dataset for the first block item
1006

Communicate the relation dataset to a server system that administers the first workspace for one or more members
1008

Receive attribute data for each subordinate block item of the first block item
1010

Generate the first block item and the subordinate block item in accordance with the attribute data
1012

*FIG. 10*

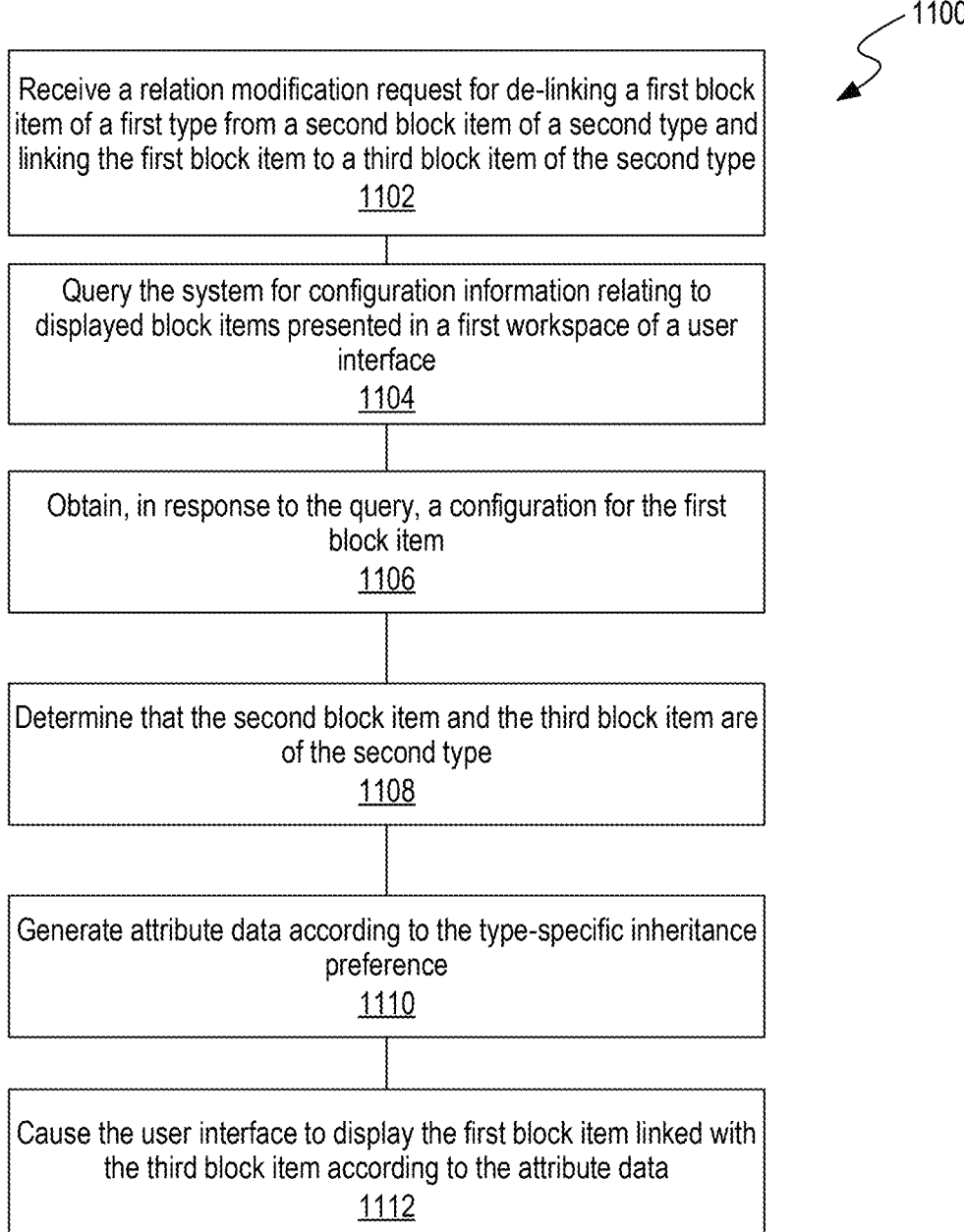

Receive a relation modification request for de-linking a first block item of a first type from a second block item of a second type and linking the first block item to a third block item of the second type
1102

Query the system for configuration information relating to displayed block items presented in a first workspace of a user interface
1104

Obtain, in response to the query, a configuration for the first block item
1106

Determine that the second block item and the third block item are of the second type
1108

Generate attribute data according to the type-specific inheritance preference
1110

Cause the user interface to display the first block item linked with the third block item according to the attribute data
1112

*FIG. 11*

RECONFIGURATION OF BLOCK ITEM HIERARCHY IN RESPONSE TO MODIFICATION REQUESTS

BACKGROUND

In the industrial design field of human-computer interaction, a user interface (UI) is the space where interactions between humans and machines occur. The goal of this interaction is to allow effective operation and control of the machine from the human end while the machine simultaneously feeds back information that aids the operators' decision-making process. User interfaces are composed of one or more layers, including a human-machine interface (HMI) that typically interfaces machines with physical input hardware (such as keyboards, mice, or game pads) and output hardware (such as computer monitors, speakers, and printers). A device that implements an HMI is called a human interface device (HID).

BRIEF DESCRIPTION OF THE DRAWINGS

Reference will now be made, by way of example, to the accompanying drawings, which show example embodiments of the present application and in which:

FIG. 3 is a block diagram illustrating a hierarchical organization of pages in a workspace.

FIG. 5 is a schematic illustrating relational information relating to displayed and non-displayed block items of a workspace.

FIG. 6 is a schematic illustrating preferences associated with block items of a workspace.

FIG. 8 is a schematic illustrating type-specific inheritance preferences for block items.

FIG. 9 is a flowchart illustrating a process for modifying display of non-displayed and displayed block items according to relational information.

FIG. 10 is a flowchart illustrating a process for configuring views associated with a user interface based on hierarchical information specifying relationships between block items.

FIG. 11 is a flowchart illustrating a process for modifying hierarchical information associated with block items based on type-specific preferences.

Figure 1:
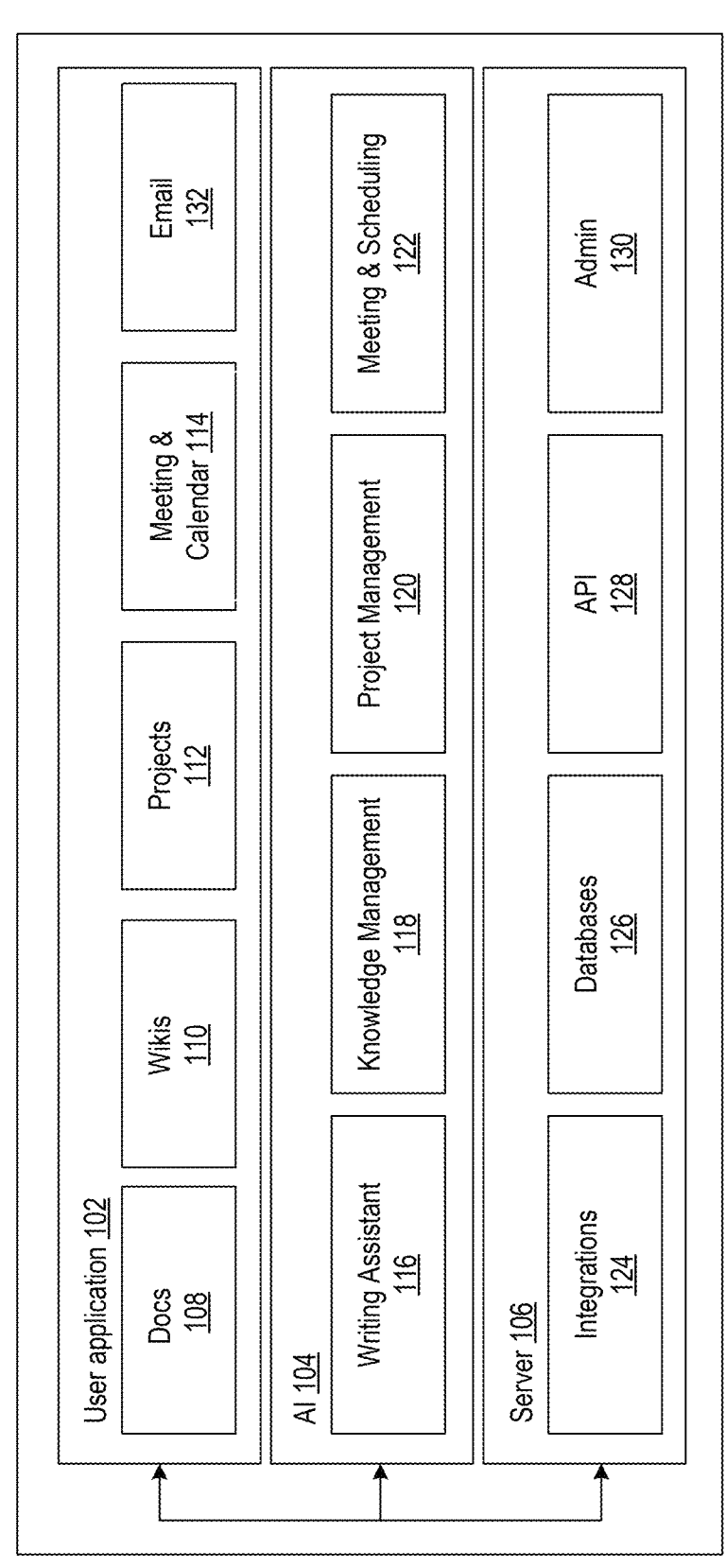
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for methods and systems for manipulating modular items (e.g., block items, such as tasks, files, links, or other blocks of data) displayed on a user interface in a manner that retains hierarchical relationships, display preferences (e.g., views), attributes, and/or access control information associated with a given user, database, or workspace of the user interface.

For example, the disclosed item modification platform enables manipulation of relationships between block items (e.g., through duplication, deletion, or reconfiguration commands) displayed on a page of a user interface in a manner that retains hierarchical relationships and preferences relating to the visibility of a given item. Moreover, the item modification platform can enable generation of views of items on the basis of such inheritance information, such as tables, calendars, or lists of representations of associated block items. In some implementations, the item modification platform enables the modification of such items in a type-dependent manner, enabling differences in item-item configurations on the basis of the types of associated items.

Existing user interfaces may include information, features, or functions that benefit from hierarchical relationships between various components. Such hierarchies can improve the effectiveness of technical features presented to users by generating structures for relationships between functions and associated items. For example, a list of files may be further organized by generating indications of hierarchical relationships (e.g., child-parent relationships) between different pages. A user interface can represent different components of databases with different importance levels or levels of abstraction through indications of relationships between these components (e.g., through drop-down menus). However, in some cases, users may not need indications of all such components and may only choose to visualize a subset of the items displayed on the user interface. While some information associated with a user interface or an underlying database may be irrelevant to some users, conventional user interfaces may still transmit the associated data to the user device for generation of the user interface, even if such data is not displayed or used by the user, thereby leading to unnecessary use of system resources.

Furthermore, when displaying information hierarchically, conventional systems struggle to provide flexible and intuitive ways to enable modification of these items. For example, existing user interfaces may not enable duplication (e.g., copy-and-paste), deletion, or reconfiguration (e.g., hierarchy modification) operations in a predictable or modular manner. Particularly in situations where some items may not be displayed to a user while other items are displayed, a user's request to manipulate may be too poorly defined for existing technologies to resolve effectively. For example, in situations where a user attempts to delete a displayed item, a conventional system may not effectively determine which items that are subordinate to this displayed item are also to be deleted if some of these subordinate items are not displayed to the user.

The item modification platform disclosed herein provides a platform for the manipulation of block items and other hierarchical information in a manner that enables the retention of such hierarchical information, as well as preferences associated with the display of associated items, thereby conferring improved performance and consistency of modification behavior. The item modification platform can receive a user request for modification of an item, such as a command to duplicate, delete, or move an item from one page to another page. The item can include any information that is displayable on the user interface, such as a block of data (e.g., a task, a file, a table, or another type of data associated with a database). Based on this request, the item modification platform can query a system (e.g., a server system) for information relating to displayed items, such as a list of files related to the item that the user requests to be modified that are being displayed on the user interface. Based on this query, the item modification platform can receive information relating to these displayed items, such as their identifiers, as well as any hierarchical or privacy information of these items. The privacy information can include access controls, such as a list of users or user types for which a given item is accessible. Based on the relational information, the item modification platform can determine a list of displayed block items that are subordinate to the first block item (the item to be modified). For example, the item modification platform can determine identifiers of files or other items that are below the first block item within the item hierarchy. The item modification platform can query a block database for further subordinate block items that may not be displayed to the user but still are subordinate to the first block item in order to generate a more complete list of items that may be affected by the user's modification request.

Based on determining these non-displayed subordinate block items, the item modification platform can modify the block database in accordance with the modification instruction (e.g., delete relevant blocks within the block database) and transmit an indication of these updated block relationships to the client device for display on the user interface. As such, the item modification platform disclosed herein enables flexible, predictable modification of items in a manner that preserves associated hierarchical information while enabling only relevant block items (e.g., items to be displayed on the user interface) to be transmitted to the user device. By doing so, the item modification platform improves the performance of the user interface by enabling the user device to receive and store displayed data while continuing to maintain a ledger of hierarchical relationships associated with non-displayed data in an off-device location. Thus, the item modification platform avoids the transmission of additional, non-displayed data (e.g., non-displayed block items) to the user device. As such, the item modification platform improves the modularity and customizability of displaying items associated with a hierarchical structure while conferring performance benefits over existing systems.

Existing systems do not exhibit flexibility in how hierarchical data is displayed on a user interface. For example, an existing system may display hierarchical items in a drop-down menu or a tree diagram. However, such systems do not confer users with the flexibility of visualizing such hierarchical relationships in alternate ways. Even in a system where different visual methods for viewing hierarchical information exist, such systems do not have a predictable way of maintaining displays of hierarchical relationships between items (e.g., block items, files, or tasks). As such, in existing systems, different views of the same items may not retain associated access permission data, inheritance data, or display preferences, thereby leading to inconsistencies between the different views. For example, some items may be associated with different requirements (e.g., security requirements) for different users. One user may have access to a particular item, while another user may not be authorized to view the same item. Existing systems do not display such hierarchical information in a secure, flexible manner.

The item modification system herein provides a platform for generating displays of block items on a user interface based on workspace-specific information, thereby enabling consistency of the generated display with any associated attributes or preferences associated with the displayed block items. The item modification platform can receive a request to generate a view associated with a first block item. For example, a user can specify a request to view a particular task in a "Calendar"-type view on the user interface. The item modification platform can receive, obtain, or retrieve information associated with preferences associated with displaying the block item. For example, the preferences can include user-specified information relating to how subordinate items (e.g., "child" blocks) of the first block item are to be displayed, which users have access to such items (e.g., access permission), how such blocks are to behave (e.g., how modification, such as duplication, affect the subordinate items), and how inheritance of properties or attributes is carried out (e.g., which properties or attributes of a parent item of the first block item are retained for the first block item). Based on these preferences, the item modification platform can generate a relation dataset for the first block item that specifies relationships between attributes of the first block item and other related items (e.g., which aspects or metadata associated with the first item is passed to other associated items).

The item modification platform can communicate these relations to a server system to receive attributes of items that are relevant to displaying the first block item and other related items. Based on these attributes, the user device can display the first block item in a manner that is consistent with the attributes and relation preferences specified by the user. For example, the user device can display the associated data in a "Calendar"-type arrangement, including any relevant subordinate items and superordinate items (e.g., child and parent items, respectively), according to user preferences. As such, the item modification platform enables users to define inheritance information to control which attributes are displayed or associated with other related items. By doing so, the item modification platform improves the flexibility and modularity of how data is displayed on the user interface while maintaining associated security or privacy controls and associated preferences.

Existing systems may have strict definitions relating the hierarchy of items of different types. For example, a file may be subordinate to a folder. However, such systems do not enable flexibility and modularity in the function of items. Furthermore, the behavior of items of different types may not be easily definable or predictable. For example, pages, tasks, files, and other items may have different functions or properties that benefit from different behavior. To illustrate, a user may desire a duplication command to apply only to certain types of files or to ignore subordinate items (e.g., items below the given file within the hierarchical structure). As such, when a user desires to modify a relationship between items (e.g., move an item from one page to another page within a given workspace), the user interface may not have the expected behavior (e.g., associated subordinate items may not migrate along with the moved item). Existing systems do not confer any flexibility or control to users regarding the behavior of items of different types, where these items are controlled by a hierarchical structure.

The item modification platform disclosed herein provides a platform for the modification of items in a type-specific manner, such as based on preferences associated with functions and attributes of a given item. The item modification platform can receive a relation modification request. For example, the item modification platform can receive a request to move a first item from a first page to a second page (e.g., by de-linking the first item from the first page and linking the first item with the second page). Based on this request, the system can query a server system for configuration information relating to the block items associated with the items displayed on the user interface to determine which other displayed items may be affected by the request to move the item between pages. In response to this query, the item modification platform can receive a configuration for the first block item, where the configuration can include preferences associated with the behavior of items within the workspace. For example, the configuration includes type-specific inheritance preferences that specify how items are affected by the first item's move between pages (e.g., which properties of the item are retained from the first page and which properties are inherited from the second page to which the item is being moved). These preferences can change or vary between the type of item associated with the move. For example, if the first item is moving between two tasks, the configuration can specify a different set of inheritance preferences.

Based on these type-specific preferences, the item modification platform can generate attribute data (e.g., associated or contained information) relating to the first item and any other affected items. The item modification platform can cause the user interface of the associated user device to display the first item linked with the second page, according to these type-specific preferences and the associated attribute data. To illustrate, the item modification platform can display the first item as an in-page object in the second page, along with any associated subordinate items as defined by the behavior specified within the received configuration. As such, the item modification platform enables flexible, type-specific behavior associated with modifications to relationships between items within the workspace, thereby improving the efficiency and modularity of the user interface.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks (e.g., block items) are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested subpages inside of pages). The content attribute of a block stores the array of block IDs (or pointers) referencing those nested blocks. Each block defines the position and order in which its content blocks are rendered. This hierarchical relationship between blocks and their render children is referred to herein as a "render tree." In one example, page blocks display their content in a new page instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface-typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title and checked: [["No"]]). The client builds operations to represent the creation of a new block with those attributes. New blocks are not created in isolation: blocks are also added to their parent's content array so they are in the correct position in the content tree. As such, the client also generates an operation to do so. All these individual change operations are grouped into a transaction. Then, the client applies the operations in the transaction to its local state. New block objects are created in memory, and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into Transaction-Queue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then, the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page or any other kind of record), the client subscribes to changes of that record from Message-Store using the WebSocket connection. When a team member opens the same page, the member is subscribed to changes of all those blocks. After changes have been made through the saveTransactions process, the API notifies MessageStore of newly recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React. Software Platform FIG. 1 is a block diagram of an example platform 100. The platform 100 provides users with an all-in-one work-space for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or subpages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a subheading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used to generate a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto-filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks, and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions), for example, as compared with models with fewer layers. In the present disclosure, the term "ML-based model" or, more simply, "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture) unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
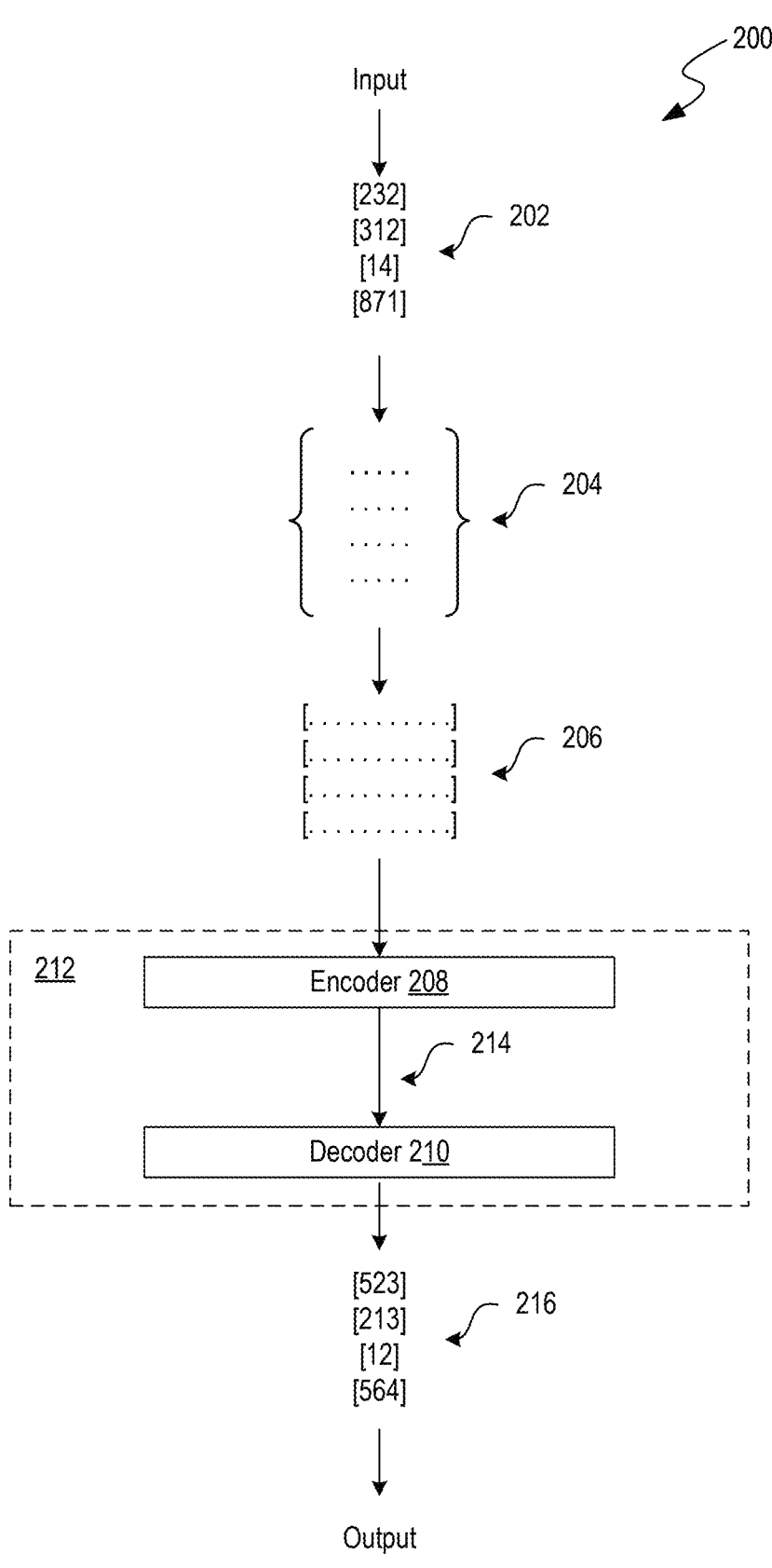
FIG. 2 is a block diagram of a transformer neural network, which may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on input formats other than natural language input. For example, the input can include objects, images, audio content, video content, or a combination thereof.

The transformer 212 can be trained on a text corpus that is labeled (e.g., annotated to indicate verbs and nouns) or unlabeled. LLMs can be trained on a large unlabeled corpus. The term "language model," as used herein, can include an ML-based language model (e.g., a language model that is implemented using a neural network or other ML architecture) unless stated otherwise. Some LLMs can be trained on a large multi-language, multi-domain corpus to enable the model to be versatile at a variety of language-based tasks, such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list or a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user, and the output can include a high-level summary of the meeting notes. In other examples, the input provided to the transformer includes a question or a request to generate text. The output can include a response to the question, text associated with the request, or a list of ideas associated with the request. For example, the input can include the question, "What is the weather like in San Francisco?" and the output can include a description of the weather in San Francisco. As another example, the input can include a request to brainstorm names for a flower shop, and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

FIG. 3 is a block diagram illustrating a hierarchical organization of pages in a workspace. As described with respect to the block data model of the present technology, a workspace can include multiple pages (e.g., page blocks). The pages (e.g., including parent or superordinate pages and child or nested/subordinate pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children, while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet, while "Page 2" is shared only internally with the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Item Modification Platform

The item modification platform disclosed herein enables flexible, modular modification of block items and the generation of a variety of views of such items for display on a user interface associated with a workspace.

Figure 4:
FIG. 4 is a schematic illustrating various views of items and their hierarchical relationships on a user interface.

FIG. 4 is a schematic 400 illustrating various views of items and their hierarchical relationships on a user interface. For example, FIG. 4 includes a schematic of a table view 402, a list view 404, a timeline view 406, and a board view 408 of a set of items (e.g., blocks). For example, the schematic 400 illustrates different visual representations of an item 410-1 (e.g., labeled "One" on FIG. 4), an item 410-2 (e.g., labeled "Two"), and an item 410-3 (e.g., labeled "Three"). Furthermore, the schematic 400 illustrates subordinate items associated with the item 410-1, including an item 412-1, an item 412-2, and an item 412-3, as shown in FIG. 4 (e.g., within the table view 402). By enabling the user interface to display various items, such as blocks, in a modifiable hierarchical structure, the item modification platform confers improved flexibility and control to users to improve the presentation of structured information.

A block can be viewed on the user interface according to a view of a given view type. A view can include a visual or graphical representation of information on the user interface. For example, a view includes a particular arrangement of items (e.g., elements, blocks, or information) on the user interface. The arrangement of these items can be defined by the type of view. For example, a view can include an arrangement of information in the form of a table, a list, a board, a timeline, a gallery, or a calendar. In some implementations, such views comprise items or blocks themselves. For example, a table-type view can be stored as a table-type block item.

The user interface can display a view in the form of a table, as shown as the table view 402 of FIG. 4. A table can include a view that structurally organizes information in the form of columns and/or tables. For example, a table can include rows, each of which represents a particular entity, item (e.g., including superordinate or subordinate items), or object, while columns can represent properties associated with these rows. In some implementations, a table includes elements that are blocks, such as files, other tables, pages, links, calendars, or other items. As shown in the table view 402 of FIG. 4, a table can represent subordinate items graphically (e.g., through an indentation or another graphical indicator). In some implementations, the user interface can provide user controls for adding, deleting, or modifying columns, rows, or other components of the table view. As such, the user interface enables flexible modification of views associated with hierarchical data stored on a database associated with the workspace or user interface.

The user interface can display a view in the form of a list, as shown in the list view 404 of FIG. 4. A list can include a view that organizes information in the form of a column or array of data (e.g., in a one-dimensional array). For example, a list can include various elements, each of which includes a block or another type of item. In some implementations, the list view 404 includes a graphical representation of subordinate and/or superordinate items associated with the list, as shown in the list view 404 of FIG. 4. In some implementations, the user interface can provide user controls for adding, deleting, or modifying elements of the list. As such, the user interface enables flexible modification of list-type views while displaying and retaining hierarchical information and relationships between items or blocks within the view.

The user interface can display a view in the form of a timeline, as shown in the timeline view 406 of FIG. 4. A timeline can include a view that organizes information chronologically (e.g., graphically in the form of a timeline). For example, a timeline can include various time-related elements, such as events, tasks, or other time-defined items or entities. For example, the timeline view 406 depicts various items (e.g., blocks), each of which depicts a start time and an end time. Such items can include graphical representations of subordinate or superordinate items. As such, the timeline view 406 enables the user interface to depict various items in a temporal manner, thereby improving the organization of the user interface and presenting information in a manner that improves project management, for example.

The user interface can display a view in the form of a calendar. A calendar can include a view that organizes information chronologically in the form of a calendar-type table. For example, a calendar can include various time-related elements, such as events, tasks, or other time-defined items or entities. A calendar can depict various items and present these by a date associated with a calendar. For example, a calendar view can include columns representing days of the week and rows representing weeks of a given month. In some implementations, the calendar view can include indications or representations of relationships between items represented on the calendar (e.g., indications of subordinate or superordinate items of items on the calendar), thereby providing an effective way of organizing hierarchical temporal data associated with a given workspace or user interface.

The user interface can display a view in the form of a board, as shown in the board view 408 of FIG. 4. A board can include a view that organizes information in the form of geometric shapes, such as rounded or unrounded rectangular blocks. For example, the board view 408 includes an indication of the items 410-1, 410-2, and 410-3 in a sleek, geometric form. In some implementations, the board view 408, or any other view of the item modification platform, depicts hierarchical information, such as whether a given item is associated with a parent item (e.g., a superordinate block item). Additionally or alternatively, the item modification platform can hide information relating to related items, such as subordinate blocks (e.g., by hiding items 410-1, 410-2, or 410-3 from the view). By organizing information in the form of a board, the item modification platform enables improved visualization of hierarchical information while providing the user with control over which relationships are displayed and/or non-displayed.

The user interface can display a view in the form of a gallery. For example, a gallery includes a view that organizes information in the form of visual components. For example, the gallery can include a visual representation of different items comprising images and associated textual information. A gallery can include a full-page gallery or an in-line gallery and can be associated with one or more databases. For example, a gallery includes cards, which may include a page (e.g., including audiovisual material, such as images, videos, or text). The gallery can include indications of subordinate or superordinate items, thereby enabling the organization and display of information associated with hierarchical structures. In some implementations, a card of a gallery is a page item or is associated with a page item.

The various views of a given user interface or workspace may include or represent items or blocks. For example, a view can include or be associated with subordinate or superordinate items (including other views). Views can be generated using in-page objects. For example, a view can include a page that includes an arrangement of representations of items on the page. The representations of items can include graphical indications summarizing or describing a given block item, such as a title, a short description, a time associated with the item, or other attributes of the block item. The user interface can determine which attributes to display on a block's associated in-page item based on the given view type of the page. For example, a user can specify, control, or determine how such objects are embedded in-page, as well as which hierarchical information associated with the given object is presented, thereby conferring improved flexibility to a user with respect to the organization of displayed information on the user interface.

For example, the item modification platform enables displaying objects representing items (e.g., blocks) of a given workspace and in a given view based on positions associated with a given object. For example, the item modification platform can determine a position for placement of the object within a given page (e.g., positions or parametric information describing a geometric shape associated with the in-page office). In some implementations, the item modification platform can determine a position (and/or geometric shape) for a given object for an item based on a view type selected by the user. The position can include an indication of coordinates (e.g., with respect to a coordinate system of the page, such as a pixel position) of corners or the center of the object on the page. As such, the item modification system enables generation of in-page objects.

A block (e.g., a block item) may be of one of a variety of item types. For example, a block can include a page, a file, a table, or a data structure that is a combination thereof. For example, blocks may represent tasks or events. A block (e.g., a page block) can be associated with other blocks of any given item type in a hierarchical structure. For example, a first page can be a subordinate page (e.g., a subpage) of a second page. Additionally or alternatively, the first page can be a superordinate page (e.g., a super-page) of the second page, wherein the second page is a subordinate page of the first page. A page can be associated with subordinate or superordinate items.

A block can include a page-type item (e.g., a page). A page can include a web page, a blog page, or any other textual, visual, or audiovisual information displayed on a two-dimensional (2D)-type interface. For example, a page includes a section of stored data (e.g., a section that can be displayed on the user interface at a given time). A page can provide an interface for displaying heterogeneous information, such as textual data, visualizations of data, and/or other media, including tasks, files, tables, events, or other data structures. As such, a page can include a variety of items or data types and can be stored within a hierarchical data structure with other pages or items.

A block can include a task-type item (e.g., a task). A task can include an indication of a process, job, or work that is to be completed, in completion, or already completed. For example, a task can include an indication of a deadline or a timeline for completing a given task (e.g., including one or more associated timestamps for a start date or completion date of the given task). For example, a given view (e.g., the timeline view 406, as shown in FIG. 4) can display tasks according to these timestamps. A task can be associated with a particular workspace or a particular project (e.g., as described in relation to the project management tool 120 of FIG. 1). Tasks may be associated with other tasks in a hierarchical manner (e.g., a sub-task may be associated with a super-task), thereby improving the flexibility of project management and facilitating the clarity of information presented on the user interface.

A block can include a file-type item (e.g., a file). A file can include a data structure including information of one or more formats. For example, a file can include a word processing document, an image, a video, a database or programming file (e.g., a programming script or an executable file), a serialized file (e.g., a Yet Another Markup Language (YAML) file), or another type of file. For example, a file is associated with a page (e.g., embedded within a page) or can be included within a table, a list, or another type of item associated with the associated workspace. Additionally or alternatively, a file may be associated with subordinate items (e.g., subitems), such as other files, tables, or pages. The inclusion of files in a hierarchical structure enables effective organization of various components of a given database, thereby conferring improved flexibility to users of the user interface.

A block can include a table-type item (e.g., a table). A table can include a data structure including information structured in rows or columns. For example, a table includes rows indicating different objects or entities, with associated elements in columns along the same row indicating attributes of properties defined by the columns. The elements of the table can comprise items or blocks. For example, the table view 402 illustrates item 410-1, item 410-2, item 410-3, item 412-1, item 412-2, and item 412-3 as components of an associated table (e.g., as part of a page). Additionally or alternatively, a table can be an item of another table. By enabling the organization of data into structured formats, such as tables, the item modification platform enables effective presentation of complex information on the user interface while preserving hierarchical information associated with the relationships between different items.

A block can include an event-type item (e.g., an event). An event can include a data structure or piece of information associated with a time. For example, an event includes a textual description of a particular time-related entity, as well as a corresponding timestamp. In some implementations, an event includes further information, including a period of time (e.g., a start and an end time), a location for the event, a list of members attending or associated with the event, and/or associated notes. The event can include subordinate items (e.g., subitems), such as files, tables, tasks, or other events associated with the given event. For example, an event can be represented in a chronological manner within a timeline view 406 of the user interface (e.g., on a page associated with the timeline view 406). By enabling the organization of events by time, the item modification platform enables the display of events in a hierarchical structure, thereby improving the organizational capabilities of the user interface for project management.

A block (e.g., any item) can be displayed or non-displayed (e.g., hidden from view), such as according to display preferences specified by the user. A displayed block can include a block that is represented visually on the user interface. For example, items 410-1 to 410-3 are displayed blocks on the table view 402, the list view 404, the timeline view 406, and the board view 408. In some implementations, a block can be hidden from view—for example, items 410-1 to 410-3 are not displayed within the board view 408. Non-displayed items can include blocks or items that are associated with other displayed blocks of the workspace (e.g., through hierarchical relationships) but are not displayed on the user interface. Additionally or alternatively, the non-displayed items are not stored on the client device and are stored on a block database associated with a server system of the workspace. By doing so, the item modification platform enables performance enhancements by reducing the information transmitted to and from the client device, as well as by reducing the data stored on the client device's storage or memory.

A. Hierarchy Modification Subsystem

The item modification platform enables users to modify relationships between items (e.g., blocks) of a given workspace while maintaining display preferences associated with the item, as well as associated hierarchical information specifying the relationship between properties of related items. For example, the item modification platform includes a hierarchy modification subsystem for management of modifications to hierarchical structures between items on the basis of user-requested item modifications.

FIG. 5 is a schematic 500 illustrating relational information relating to displayed and non-displayed block items of a workspace. The relational information can include a representation of hierarchical information between blocks relating a workspace, a database, or the associated user interface. For example, the schematic 500 includes a representation of a root block 502 that is placed hierarchically below a workspace or database associated with the user interface. The root block 502 includes various subordinate blocks with various levels. For example, a block 504-1, a block 504-2, and a block 504-3 correspond to child blocks (e.g., subordinate blocks) of the root block 502. In some implementations, the child blocks can include other subordinate blocks (which are, in turn, also subordinate blocks of the root block 502). For example, the block 504-1 is associated with a child block, the block 506-1. The block 504-2 is associated with multiple child blocks, including the block 506-2 and the block 506-3. The block 504-3 is associated with a child block, the block 506-4, as shown in FIG. 5. The item modification platform may exhibit various levels of such subordinate or superordinate blocks. For example, the block 506-2 can exhibit a child block corresponding to the block 508.

As described above, blocks (e.g., subitems) can be non-displayed (e.g., hidden within a view) or displayed. The schematic 500 illustrates non-displayed blocks in dark shading (e.g., corresponding to the block 504-1, the block 504-3, the block 506-4, and the block 508). The schematic illustrates displayed blocks without shading (e.g., corresponding to the root block 502, the block 504-2, the block 506-1, the block 506-2, and the block 506-3). The item modification platform, through the hierarchy modification subsystem, enables user-controlled determinations of the display status of a given block (e.g., whether a block is non-displayed or displayed).

The relational information depicted in the schematic 500 can include information relating to hierarchical relationships between items. For example, the relational information can be depicted in a data structure representing a tree (e.g., through entries in a markup file, such as a YAML file). In some implementations, the relational information is stored as a data structure of pointers, where each item is associated with a pointer to a storage location or another identifier associated with a parent item (e.g., a superordinate block). The relational information can be generated based on user preference, such as through a user interface enabling a user to specify relationships between items of the workspace. The relational information can include inheritance information for the items, such as information relating to which properties of a given item are retained or applied to other items. As such, the relational information associated with the schematic 500 enables the item modification platform to track and retain relationships between items during modifications to items requested by the user.

For example, the user can request to modify an item based on an instruction (e.g., an instruction to duplicate, delete, or reconfigure a given block). An instruction can include a command, an action, or another indication by the user (e.g., through the user interface) indicating a desire to modify or interact with a given item. For example, the request to modify the item can include a request through a user interface, such as through a control (e.g., a button, a radio button, a drop-down menu, a context menu, a pop-up, or another user control). By receiving instructions through the user interface, the item modification platform enables user control and flexibility over item modification (e.g., duplication, deletion, or reconfiguration of items).

A duplication instruction can include a command to duplicate a given block (e.g., a first block item) associated with a workspace. As an illustration, a duplication instruction includes a command to generate a second block identical to a first block (e.g., with at least some of the same attributes associated with the same properties). For example, a duplication instruction can include a copy-and-paste-type operation, where the target, duplicated block is in the same or a different location (e.g., associated with the same or a different superordinate block) as the original block.

A deletion instruction can include a command to delete a given block (e.g., a first block item) associated with a workspace. As an illustration, a deletion instruction includes a command to remove a first block item from the user interface. For example, a deletion instruction can include a cut-type operation, where information or attributes associated with the target block are removed from the display on the user interface and/or an associated database. The deletion instruction can include preferences specifying whether or how subordinate blocks are treated. For example, the deletion instruction can include an indication as to whether subordinate blocks are also to be deleted in response to the deletion instruction or whether the subordinate blocks are to be retained (e.g., by removing the superordinate block to these subordinate blocks).

A reconfiguration instruction for a first block can include a command to link the first block with a first superordinate block item (e.g., in some implementations, by removing an existing link with a second superordinate block item). For example, a reconfiguration instruction includes a command requesting a move of an item from one page to another page, thereby de-linking the item from a first page and linking the item with a second page. As such, a reconfiguration instruction includes a request to modify a hierarchy associated with the item and its related blocks (e.g., its superordinate blocks).

The hierarchy modification subsystem disclosed herein enables handling of such instructions while maintaining, for affected items, appropriate hierarchy information, attribute information, and privacy information and ensuring that the resulting items are displayed according to specified displayed preferences. The hierarchy modification subsystem can leverage a block database to store and track such information. For example, the block database can store information relating to item identifiers (e.g., block identifiers), attributes associated with the block database (e.g., titles, tags, timestamps, or other such information), hierarchical relationships (e.g., associated parent and/or child blocks), access permission information (e.g., workspaces or user identifiers for whom a given block is accessible), modification behavior information (e.g., relating to the inheritance of properties), and display preferences (e.g., associated with whether a block is displayed or non-displayed).

The block database can be stored on a server system apart from the client device. As such, upon any modification requests by a user of the client device, the server system can maintain a ledger of such modifications and transmit information relevant to the client device while filtering out information that is irrelevant to the user. To illustrate, the server system can receive a request to duplicate a first block, with a first displayed subordinate block and a second non-displayed subordinate block. In some implementations, the non-displayed subordinate block is not stored on the client device. The server system can modify the block database to carry out the duplication, such as by duplicating the first block, the first displayed subordinate block, and the second non-displayed subordinate block and by storing these blocks and associated information within the block database. The server system can communicate an indication of the first block and the first displayed subordinate block to the client device for display on the associated user interface while withholding information relating to the second non-displayed subordinate block. As such, the item modification platform disclosed herein (e.g., through the hierarchy modification subsystem) enables reduced transmission and storage of information with respect to the client device, conferring performance benefits.

B. View Generation Subsystem

The item modification platform enables the display of items associated with a hierarchical organization within a variety of views based on user preferences. For example, the item modification platform includes a view generation subsystem for generating personalized, user-dependent views of hierarchical blocks associated with a given workspace based on display preferences, access permission preferences, modification preferences, and/or inheritance preferences.

For example, the view generation subsystem can receive a request to generate a view associated with a block item of the workspace (e.g., an existing or yet-to-exist block, such as a task, event, or file). Based on this request, the view generation subsystem can obtain, retrieve, or receive information relating to a desired presentation (e.g., a view) of the associated block, such as in a calendar view, a table view, or a board view. Other information specified by the user through the user interface can include information relating to whether associated subordinate or superordinate blocks are displayed (e.g., through display preferences), which users or workspaces have access to the given view and associated blocks (e.g., through access permission preferences), how modifications to blocks or block hierarchy are handled (e.g., through modification preferences), and/or how properties are linked between associated items (e.g., through inheritance preferences).

FIG. 6 is a schematic 600 illustrating preferences associated with one or more particular block items of a workspace. For example, the schematic 600 includes a data structure including preferences 602 associated with a user of the user interface and associated values 604. The preferences can include a display preference indicating display settings associated with the first block to be displayed. For example, the display preference can indicate a view type for displaying specified blocks (e.g., blocks associated with the block identifier 606 shown in FIG. 6). Display preferences can include information associated with the display preferences of related blocks (e.g., whether subordinate blocks are displayed or non-displayed), as well as how they are displayed on the user interface (e.g., in a drop-down menu associated with the first block or within a hidden window). By retrieving or obtaining display preferences associated with a given block, the item modification platform disclosed herein can display the associated blocks in a manner consistent with user preferences.

The preferences can include an access permission preference associated with which workspaces and/or users are allowed to access the specified block item(s). For example, the access permission can include an identifier of workspaces for which access to the block specified by the block identifier 606 is allowed. Additionally or alternatively, the access permissions specify particular users, members, or client devices affiliated with the workspace for whom access to the specified blocks is authorized. In some implementations, the access permissions can specify read/write/execute permissions for particular workspaces or members/devices of such workspaces. The access permission preferences can specify similar access-related information for associated subordinate items. Such information can be specified in the form of a ruleset (e.g., a data structure including criteria for access to the specified items, blocks, or views). As such, the view generation subsystem disclosed herein enables flexible, secure control over system privacy.

The preferences can include a modification preference associated with the item modification platform's behavior in response to a request to modify the particular blocks and/or the associated hierarchical organization. For example, the modification preference can include specifications of preferences relating to modification behavior associated with duplication, deletion, and/or reconfiguration of blocks associated with the given view and/or specified blocks.

For example, the modification preference includes an indicator specifying that, upon receiving a request for duplication of the associated block, the item modification platform is to generate a new block. Additionally or alternatively, the modification preference can specify that, in response to receiving such a duplication request, the item modification platform is to generate a new visual representation of the block only while maintaining a single ledger for the attributes of both the original block and the newly created block.

The modification preference can include an indicator specifying that, upon receiving a request for deletion of the associated block, the item modification platform is to retain the subordinate blocks (e.g., by removing the associated ordinal relationship). Additionally or alternatively, the modification preference can specify that, in response to receiving such a deletion request, the item modification platform is to remove all (or a subset of) subordinate blocks associated with the target block.

The modification preference can include an indicator specifying that, upon receiving a request for reconfiguration of the associated block, the item modification platform is to retain the block's relationships with its subordinate blocks. Additionally or alternatively, the modification preference can specify that, in response to receiving such a reconfiguration request, the item modification platform is to remove indications of a parent-child relationship between the target block and its subordinate blocks.

As such, by enabling specification of modification preferences, the view generation subsystem enables users to flexibly specify customizable behavior associated with the workspace's hierarchical organization, thereby improving the effectiveness of the associated user interface in managing complex relationships between items.

The preferences can include an inheritance preference specifying relationships between preferences associated with superordinate and/or subordinate blocks of the particular blocks. For example, the inheritance preference indicates, for the specified block (e.g., the block identified by the block identifier 606), whether properties are inherited from the superordinate block and/or whether properties are transferred to the specified block's subordinate blocks. In some implementations, the inheritance preferences can indicate which properties for which inheritance applies (e.g., for particular subordinate blocks of a particular identifier or a particular block type). As such, the item modification platform enables users to specify how inheritance is carried out, thereby conferring improved flexibility in how blocks are displayed and hierarchical relationships are maintained.

Based on these preferences, the item modification platform (e.g., through the view generation subsystem) can generate a relation dataset for the first block item (e.g., including the relational information described in relation to FIG. 5 above). Additionally or alternatively, the relation dataset can include information associated with properties of the first block item that are associated with the related subordinate or superordinate block items. For example, based on the inheritance preferences and the modification preferences, the view generation subsystem generates a data structure that specifies which properties of the first block are applied to or derive from the properties of the related superordinate and subordinate blocks within the workspace (e.g., including any or all blocks that are to be displayed on the requested view). By doing so, the item modification platform can compile information associated with relationships between relevant items for further generation of the view in a manner consistent with user preferences.

Based on transmitting the relation dataset to a server system, the item modification platform can receive, generate, or determine attribute data associated with the view and related blocks (e.g., consistent with the determined relation dataset). For example, the item modification platform can receive attributes for each of the blocks that are to be displayed on the user interface based on which blocks' properties are related to one another.

For example, the item modification platform, at the client device, receives attributes associated with blocks of the requested view (e.g., displayed blocks). Such attribute data can include attributes that correspond to the blocks' properties. For example, the attributes can include titles, tags, timestamps, descriptions, files, or other items, such as other subordinate items. The attributes can include the preferences themselves (e.g., display preferences, such as whether the block is displayed or non-displayed, or modification preferences associated with how the block is to be modified). For example, the attribute data includes any information or data within the body of any of the corresponding blocks to be displayed. The attribute data can be synchronized with one, some, or all of the preferences indicated in the user request. In some implementations, the attribute data includes privacy information for the associated blocks, including which users or workspaces have access to the specified blocks.

The item modification platform can display, on the user interface, the block item and any associated subordinate block items in accordance with the attribute data. By receiving such attribute information, the view generation subsystem enables generation of the user interface in a manner consistent with user preferences, thereby improving the flexibility and modularity of the user interface described herein.

C. Type-Dependent Modification Subsystem

The item modification platform enables the reconfiguration of items' relationships, such as the modification of an item's association with pages. For example, the item modification platform includes a type-dependent modification system for handling items that are moved from a first page to a second page by specifying movement behavior that is customizable and type-dependent.

To illustrate, the item modification platform can receive a request from a user to move an item from being associated with a first item (e.g., a first page) to being associated with a second item (e.g., a second page). Based on this request, the item modification platform (e.g., through a type-dependent modification subsystem housed on the client device) can query a server system for configuration information relating to displayed block items presented in the associated workspace and obtain, in response to the query, information relating to the inheritance behavior of the item. For example, this information can include a configuration that specifies type-specific inheritance preferences associated with the first block item in order to determine which properties of the first item are retained from the original item (e.g., the first page) and which properties of the first item are to be acquired from the target item (e.g., the second page).

Figure 7:
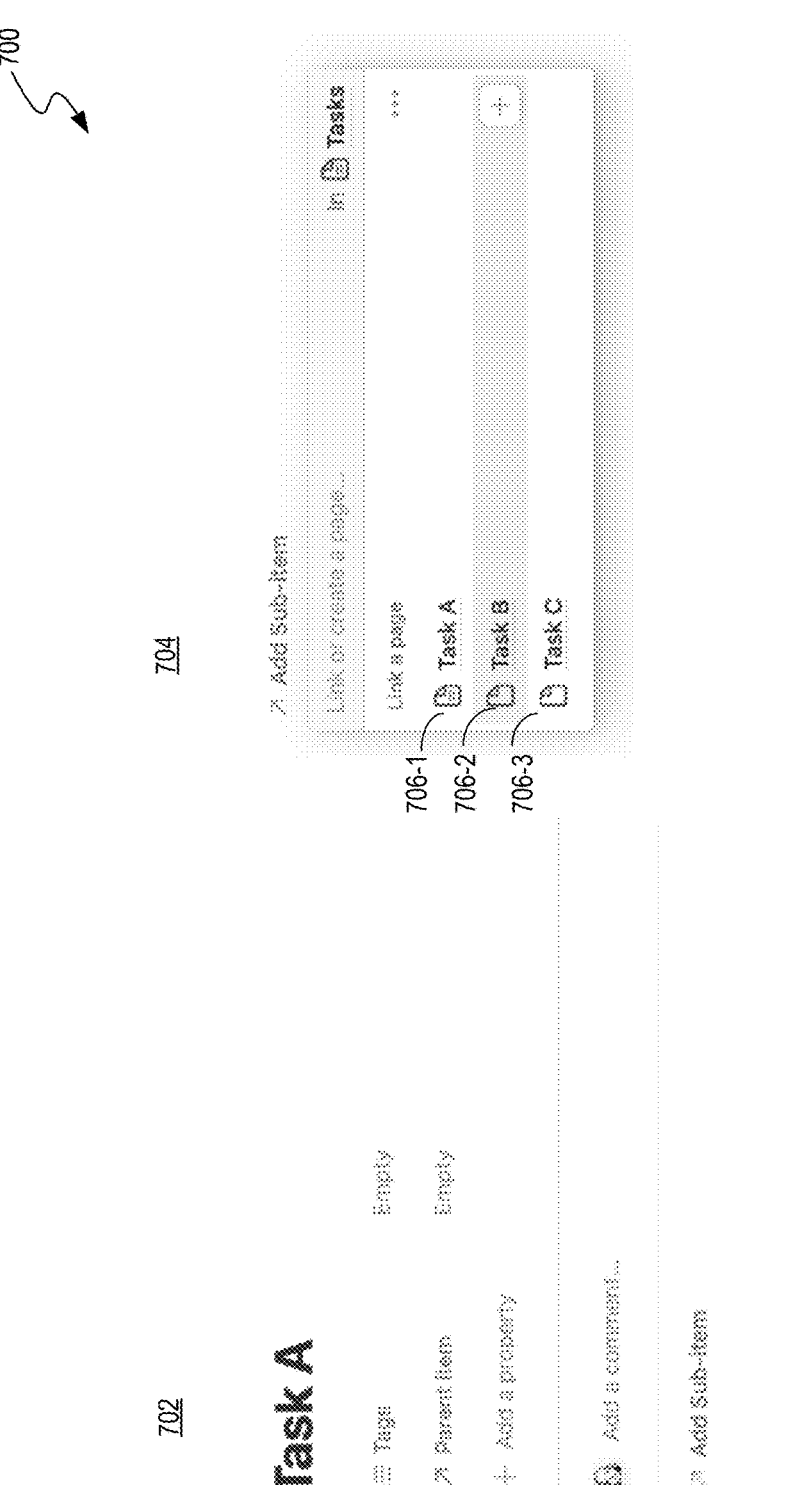
FIG. 7 is a schematic illustrating block items associated with page-type items and an associated user interface for specification of type-specific inheritance preferences.

FIG. 7 is a schematic 700 illustrating block items associated with page-type items and an associated user interface for specification of type-specific inheritance preferences. For example, the schematic 700 illustrates a first item 702 (e.g., a page-type item), as well as a user interface 704 for specifying a relationship between the first item 702 and another item (e.g., item 706-1, item 706-2, or 706-3). In some implementations, the user interface 704 (e.g., through a drop-down menu) enables a user of the user interface to specify a subordinate item to link to the item 702, including type-specific inheritance behavior, thereby improving the flexibility and configurability of the user interface for the management of complex hierarchical relationships between displayed and non-displayed items.

FIG. 8 is a schematic 800 illustrating type-specific inheritance preferences for block items. For example, schematic 800 illustrates a data structure specifying block retention preferences 804 and inheritance preferences 806 associated with different item types 802. For example, the type-specific inheritance preferences can specify which attributes of a block item are retained from an origin item (e.g., a first page in a move from a first page to a second page) and which attributes of the block item are inherited from the target item (e.g., from the second page).

For example, in the context of moving an item from a first block to a second block (e.g., from a block to be unlinked to a block to be linked), the type-specific inheritance properties can include a set of properties of the first block that are to be retained from the block to be unlinked and/or a set of properties of the first block that are to be inherited from the block to be linked, as shown in FIG. 8. For example, the type-specific inheritance properties can specify that if the item is to be moved between different pages, the title, tags, and date of the original page are to be retained, while the descriptions, files, and subitems are to be updated based on the target page to which the item is to be moved. Additionally or alternatively, the type-specific inheritance properties can specify that if the item is to be moved between different tasks, the title of the original page is to be retained, while the tags, date, description, files, and subitems are to be updated based on the target task to which the item is to be moved.

Such inheritance preferences can, in some implementations, specify more complex combinations of unlinked or linked block types. For example, the type-specific inheritance preferences can specify block retention preferences or block inheritance preferences for a move of an item from a page to a task, from a task to a page, or, generally, between blocks of two distinct types.

Based on these preferences, the type-dependent modification subsystem enables the user interface to generate the first block item as linked to the target item (e.g., the target page) according to these inheritance preferences, thereby conferring improved control over the display of hierarchy-dependent items within the user interface.

Process for Modifying Displayed Items According to Relational Information

FIG. 9 is a flowchart 900 illustrating a process for modifying the display of non-displayed and displayed block items according to relational information. For example, the item modification platform disclosed herein enables modification of items (e.g., tasks, pages, or events) displayed on a user interface in a manner that retains associated hierarchical relationships with other superordinate or subordinate items. By doing so, the item modification platform enables tracking, manipulation, and display of information organized in complex, hierarchical structures.

At operation 902, the item modification platform can receive a request to modify a block item of a workspace. For example, the item modification platform receives, via a client device for a first user, a request to modify a first block item that is embedded as an in-page object on a page of a first workspace, where the request includes an instruction to duplicate, delete, or reconfigure the first block item. As an illustrative example, the item modification platform can receive a "copy-and-paste," "delete," or "move" request to modify a task, event, or page associated with a workspace. By receiving such information, the item modification platform enables control over the placement and relationships associated with items on the user interface, thereby conferring improved control and flexibility to users.

At operation 904, the item modification platform can query a server system for information relating to displayed block items on the user interface. For example, in response to the request being received, the item modification platform queries the system for information relating to displayed block items presented on a user interface of the client device. As an illustrative example, the item modification platform queries a server system associated with the administration of the workspace for information relating to displayed blocks (e.g., events, tasks, files, or pages that are not hidden within a view on the user's device). By requesting such information, the item modification system can ensure that any blocks affected by the requested modification are identified and tracked to ensure the consistency of established hierarchical relationships between items of the user interface.

At operation 906, the item modification platform can receive identifiers for the displayed block items, as well as associated relational information and privacy information. For example, the item modification platform receives a set of identifiers of the displayed block items, relational information that indicates hierarchical relationships among the displayed block items, and privacy information that includes access permissions information for the displayed block items. As an illustrative example, the item modification platform can receive information relating to any items (e.g., tasks, events, or pages) associated with the block that is to be modified, as well as any associated hierarchical or privacy-related information (e.g., indications of members or workspaces with access to such blocks). By receiving such information, the item modification platform can ensure that, in response to modifying any blocks, the privacy controls and associated hierarchical relationships are retained, thereby improving the consistency and robustness of the user interface with respect to modification.

At operation 908, the item modification platform can determine displayed subordinate block items associated with the first block item. For example, the item modification platform determines, based on the relational information, an indication of displayed subordinate block items associated with the first block item and presented on the user interface of the client device. As an illustrative example, the item modification platform can determine which block items are subordinate to the block that is to be modified. For example, the item modification platform determines any events that are associated with a given page (e.g., events that are a part of the page or are subordinate to the page). Based on this determination, the item modification platform can ensure that, in response to modifying the page, the page's relationship with the associated events is retained, thereby ensuring consistency and retention of any defined hierarchical relationships associated with the workspace.

At operation 910, the item modification platform can obtain non-displayed subordinate block items for the first block item by querying a block database. For example, the item modification platform uses the indication of displayed subordinate block items to query a block database to obtain non-displayed subordinate block items for the first block item, where the non-displayed subordinate block items are not displayed to the first user. As an illustrative example, the item modification system can determine a list of blocks that may not be displayed to the user on the user interface based on a block database associated with a server system that administrates the workspace. For example, some subordinate blocks to the block that is to be modified may be non-displayed or unavailable to the user (e.g., due to display preferences or access permissions). The item modification platform can determine identifiers of these non-displayed blocks to ensure that, following any modifications to the target block, the associated relationships with subordinate blocks are retained, even if such blocks are not displayed on the user interface. By doing so, the item modification platform ensures consistency across various user interfaces within the workspace for both non-displayed and displayed blocks that are affected by a given modification.

At operation 912, the item modification platform can modify the block database in accordance with the user's instruction and the information relating to the subordinate block items. For example, the item modification platform modifies the block database in accordance with the instruction, the displayed subordinate block items, and the non-displayed subordinate block items. As an illustrative example, the item modification platform can modify the block database to implement any requested instructions from the user with respect to the first block (e.g., the target block) while retaining any hierarchical relationships and access permissions associated with related blocks or items. For example, in response to a request to duplicate the first block, the item modification platform can ensure that the ledger tracking the blocks of the workspace indicates a duplicated target block. By doing so, the item modification platform enables modifications to blocks within the platform in a predictable, user-defined manner, conferring the user interface with flexibility and control while ensuring consistent modification behavior so as to retain any nuances or complexities associated with the hierarchical structure of the workspace's items.

In some implementations, the item modification platform can receive an instruction to delete the first block item and modify the block database accordingly. For example, the item modification platform determines that the request includes the instruction to delete the first block item. In response to determining that the request includes the instruction to delete the first block item, the item modification platform can modify the block database to remove (1) the first block item, (2) the displayed subordinate block items, and (3) the non-displayed subordinate block items. As an illustrative example, the item modification platform determines that the user is requesting deletion of a block associated with the workspace. Based on this determination, the item modification platform can ensure that this target item, as well as any subordinate items (e.g., events, tasks, or files associated with the target page), is deleted. As such, the disclosed item modification platform improves the consistency of user-requested operations on items within the user interface with respect to the hierarchical structure of such items.

In some implementations, the item modification platform can receive an instruction to reconfigure a first block item to be associated with a different superordinate block and modify the block database accordingly. For example, the item modification platform determines that the request includes the instruction to reconfigure the first block item, where the instruction to reconfigure the first block item includes a request to de-link the first block item from a first superordinate block item. In response to determining that the request includes the instruction to reconfigure the first block item, the item modification platform can modify the relational information to remove a hierarchical relationship between the first superordinate block item and the first block item, where the hierarchical relationship indicates that the first superordinate block item is not superordinate to the first block item. The item modification platform can modify the block database to include the modified relational information. As an illustrative example, the item modification platform determines that the instruction includes a request to move a given item (e.g., a task, event, or file) from one page to another page. Based on this request, the item modification platform can modify the relational information (e.g., associated hierarchical information) to remove a link between the first page and the given item and generate a link between the second page and the given item. By doing so, the item modification platform can accurately capture any requested modifications to the hierarchical structure associated with the block item, thereby conferring improved flexibility to the user.

At operation 914, the item modification platform can determine updated displayed block items. For example, the item modification platform determines, using the modified block database, updated displayed block items. As an illustrative example, the item modification platform generates an updated set of block items that are to be displayed on the user interface, such that the updated items are consistent with the modifications that were requested. For example, the item modification platform can determine information relating to the duplicated block item (if a duplication operation was requested), as well as any duplicated superordinate or subordinate items, as consistent with the modified block database. By doing so, the item modification platform enables any displayed items to be consistent with the block database, thereby retaining any defined hierarchical relationships and access permissions.

At operation 916, the item modification platform can communicate information relating to the updated displayed block items to the client device. For example, the item modification platform communicates an indication of the updated displayed block items to the client device, wherein the indication of the updated displayed block items includes modified relational and privacy information associated with the updated displayed block items. As an illustrative example, the item modification platform can generate the items for display on the user interface (e.g., as embedded in a page associated with the workspace) in a manner that is consistent with the requested modification, hierarchical relationships between items in the workspace, and any relevant access permissions. By doing so, the item modification platform ensures the flexibility, modularity, and security of the user interface and associated workspaces by enabling modifications to items while retaining associated hierarchical information and access controls.

In some implementations, the item modification platform responds to an instruction to duplicate a block by generating a new version of this block. For example, the item modification platform determines that the request includes the instruction to duplicate the first block item. In response to determining that the request includes the instruction to duplicate the first block item, the item modification platform can generate (1) a second block item identical to the first block item, (2) a second set of non-displayed subordinate block items identical to the non-displayed subordinate block items, and (3) a second set of displayed subordinate block items identical to the displayed subordinate block items. The item modification platform can generate second relational information, where the second relational information includes an indication that the second set of displayed subordinate block items and the second set of non-displayed subordinate block items are subordinate to the second block item. The item modification platform can store, in the block database, (1) the second block item, (2) the second set of non-displayed subordinate block items, (3) the second set of displayed subordinate block items, and (4) a representation of the second relational information. As an illustrative example, the item modification platform duplicates information associated with the target block, including information associated with subordinate blocks (e.g., both non-displayed and displayed), as well as information associated with the blocks' attributes, to enable the duplication of associated hierarchical relationships between the target block and associated subordinate blocks. As such, the item modification platform enables consistent duplication of blocks in a manner that consistently retains access permissions and block hierarchy.

In some implementations, the item modification platform can communicate this information relating to the duplicated block to the client device (e.g., for generation of the block items for display on the user interface). For example, the item modification platform determines, using the modified block database, block items comprising (1) the first block item, (2) the displayed subordinate block items, (3) the second block item, and (4) the second set of displayed subordinate block items. The item modification platform can communicate an indication of the block items to the client device. As an illustrative example, the item modification platform enables communication of the duplicated blocks (e.g., a duplicated page) to the client device for display on the user interface. By doing so, the item modification platform ensures that the duplicated block, as well as any associated subordinate blocks, is displayed on the user interface consistent with the instruction to duplicate the associated block.

In some implementations, the item modification platform can receive an instruction to reconfigure a block (e.g., move a block from being associated with a first superordinate item to a second superordinate item) and modify the block database accordingly. For example, the item modification platform determines that the request includes the instruction to reconfigure the first block item, where the instruction to reconfigure the first block item includes a request to link the first block item with a first superordinate block item. In response to determining that the request includes the instruction to reconfigure the first block item, the item modification platform can generate second relational information comprising a hierarchical relationship between the first superordinate block item and the first block item, where the hierarchical relationship indicates that the first superordinate block item is superordinate to the first block item. The item modification platform can modify the block database to include the second relational information. As an illustrative example, the item modification platform receives a request to move an item from a first page to a second page (e.g., move a task, event, or file from a first page to a second page). Based on this request, the item modification platform can reconfigure any hierarchical relationships between the item and its subordinate items (including any non-displayed items) to ensure that, when modifying the database, such relationships are retained (e.g., by ensuring that subordinate blocks are also reconfigured accordingly). As such, the item modification platform enables modification of hierarchical relationships in a manner that is predictable and intuitive, improving the flexibility and effectiveness of the user interface in presenting complex hierarchical structures between displayed items.

In some implementations, the item modification platform can communicate the information relating to the reconfigured block to the client device (e.g., for display on the user interface). For example, the item modification platform determines, using the modified block database and the second relational information, block items comprising (1) the first block item, (2) the displayed subordinate block items, and (3) the first superordinate block item. The item modification platform can communicate an indication of the block items to the client device. As an illustrative example, the item modification platform communicates the information associated with moving the item from a first page to a second page, including any displayed subordinate blocks associated with the modification. As such, the item modification platform ensures that any information displayed on the user interface is consistent with information stored on the block database upon any reconfigurations of hierarchical structures.

In some implementations, the item modification platform causes the updated displayed block items to be displayed according to a view type (e.g., as specified by the user through the user interface). For example, the item modification platform determines, using the modified block database, a view type associated with the updated displayed block items, where the view type includes one of a table, a list, a board, a timeline, a gallery, or a calendar. The item modification platform can communicate the indication of the updated displayed block items to include the view type. As an illustrative example, the item modification platform can ensure that the displayed block items are displayed according to a user-defined or workspace-defined graphical structure (e.g., on a calendar or a table). For example, the user interface can display the items according to the view type in a manner that displays hierarchical relationships between items (e.g., parent-child relationships), thereby enabling the user interface to present complex hierarchical relationships between items in a manner that is consistent with any modifications requested by the user.

In some implementations, the item modification platform causes the updated displayed block items to be displayed as an in-page object. For example, the item modification platform determines, using the modified block database, an indication of the page associated with the first block item. The item modification platform can communicate the indication of the page to the client device to cause the user interface to display the updated displayed block items embedded as the in-page object of the page. As an illustrative example, the item modification platform can embed the target item (e.g., a task) within a page associated with the workspace, thereby enabling an effective display of the information (e.g., attributes) associated with the item.

Process for Configuring Views According to Hierarchical Information

FIG. 10 is a flowchart 1000 illustrating a process for configuring views associated with a user interface based on hierarchical information specifying relationships between block items. For example, the item modification platform enables the generation of or configuration of views associated with blocks on the user interface in a manner that retains any access control information, display preferences, or hierarchical information associated with the blocks.

At operation 1002, the item modification platform can receive a request to generate a view including a specified block. For example, the item modification platform receives, via a user interface displayed on a client device, a first request to generate a view associated with a first block item of a first workspace, where the first block item is embedded as an in-page object on a page of the first workspace. As an illustrative example, the item modification platform can receive a request to generate a graphical representation of one or more items (e.g., tasks, events, pages, or files) on the user interface in a customized manner (e.g., according to a view type). By doing so, the user interface enables flexible display of items according to any associated attributes, hierarchical information, and access permissions.

In some implementations, the item modification platform receives a request to generate a view with a particular view type. For example, the item modification platform determines that the first request includes, for the first block item, an indication of a first view type including one of a table, a list, a board, a timeline, a gallery, or a calendar. The item modification platform can store an indication of the first request including the first view type. As an illustrative example, the item modification platform can receive a request to generate a view according to a table, list, board, timeline, gallery, or calendar format (e.g., thereby defining a manner of visually organizing the affected blocks on the user interface). By doing so, the item modification platform provides graphical templates for organization of hierarchical relationships or attributes of items, thereby providing users with improved flexibility in determining how information is presented on the user interface.

At operation 1004, the item modification platform can receive another request to configure any displayed items' hierarchical structure. For example, the item modification platform receives, via the user interface displayed on the client device, a second request to configure a display of a hierarchy of block items that are related to the first block item, where the second request indicates preferences for at least two of (i) a display of a subordinate block item of the first block item, (ii) an access permission for the subordinate block item, (iii) a modification for the subordinate block item, or (iv) an inheritance associated with a superordinate block item of the first block item. As an illustrative example, the item modification platform can receive a request that indicates a configuration or preferences associated with the display of items on the chosen view (e.g., associated with how to handle related items according to the hierarchical structure of the items within the workspace, as well as according to associated display preferences, access permissions, or item modifications). As such, the item modification platform enables improved control over the behavior of items displayed on the view.

At operation 1006, the item modification platform can generate a relation dataset for the block based on the second request. For example, the item modification platform generates, at the client device, based on the second request, a relation dataset for the first block item, where the relation dataset relates properties of the first block item with properties of the subordinate or the superordinate block items. As an illustrative example, the item modification platform generates information relating to how properties are related to each other with respect to related items in the hierarchical structure of the workspace. As such, the item modification platform ensures that attributes associated with the blocks displayed on the user interface retain any attributes as required by the hierarchical relationships defining these blocks.

In some implementations, the item modification platform generates the relation dataset based on associated access permission preferences that indicate particular workspaces for whom the blocks are accessible. For example, the item modification platform determines, based on the second request, an access permission preference for the subordinate block item, where the access permission preference includes a ruleset for generating workspace identifiers associated with the subordinate block item. The item modification platform can generate the relation dataset to include the access permission preference. As an illustrative example, the item modification platform can ensure that only workspaces that are authorized to view the associated blocks are able to view these blocks within the user interface, thereby ensuring the security of the system by imposing any required privacy controls over the affected blocks.

In some implementations, the item modification platform generates the relation dataset based on associated access permission preferences that indicate particular members for whom the blocks are accessible. For example, the item modification platform determines, based on the second request, an access permission preference for the subordinate block item, where the access permission preference includes a ruleset for generating member identifiers associated with the subordinate block item. The item modification platform can generate the relation dataset to include the access permission preference. As an illustrative example, the item modification platform can ensure that only members (e.g., users) of the workspace who are authorized to view the associated blocks are able to view these blocks within the user interface, thereby ensuring the security of the system by imposing any required privacy controls over the affected blocks.

In some implementations, the item modification platform generates the relation dataset based on a modification preference indicating the behavior of blocks upon modification by the user. For example, the item modification platform determines, based on the second request, a modification preference associated with the subordinate block item, where the modification preference includes a ruleset for at least one of a block item duplication, deletion, or reconfiguration. The item modification platform can generate the relation dataset to include the modification preference. As an illustrative example, the item modification platform can receive information associated with how subordinate or superordinate blocks associated with the workspace are handled upon duplication, deletion, or reconfiguration. By doing so, the item modification platform can ensure that behavior associated with the duplication, deletion, reconfiguration, or associated actions is defined, controlled, or predictable, thereby ensuring the flexibility and consistency of the user interface for displaying and modifying hierarchical relationships associated with blocks within the workspace.

At operation 1008, the item modification platform can communicate the relation dataset to a server system that administers the associated workspace. For example, the item modification platform communicates the relation dataset to a server system that administers the first workspace for one or more members of the first workspace. As an illustrative example, the item modification platform can request information associated with attributes of items to be displayed on the user interface in a manner that is consistent with relationships, access permissions, and preferences for the associated blocks.

At operation 1010, the item modification platform can receive attribute data for each subordinate block item of the first block item. For example, the item modification platform receives, from the server system, attribute data for each subordinate block item of the first block item, where the attribute data is synchronized with the preferences indicated in the second request. As an illustrative example, the item modification platform receives attributes associated with blocks to be displayed on the user interface, such that the attributes are consistent with the received user preferences. By doing so, the item modification platform ensures that items are displayed according to any requested modification criteria, display preferences, access permissions, and hierarchical relationships between items, thereby conferring improved flexibility and control over how such information is displayed.

At operation 1012, the item modification platform can generate the block and associated subordinate blocks for display on the user interface. For example, the item modification platform generates, for display on the user interface, the first block item and the subordinate block item in accordance with the attribute data. As an illustrative example, the item modification platform can display the items according to the view type and preferences, thereby enabling the display of complex, hierarchical relationships between items in a user-friendly, flexible, and secure manner.

In some implementations, the item modification platform generates the item on the user interface based on an associated view type. For example, the item modification platform determines, using the attribute data, a second inheritance associated with the subordinate block item. The item modification platform can determine, based on the first view type and the second inheritance, a second view type for the subordinate block item. The item modification platform can generate the first block item in accordance with the first view type and the subordinate block item in accordance with the second view type. As an illustrative example, the item modification platform generates the item according to the specified view type by placing the item in a manner consistent with the view type. For example, when the specified view type corresponds to a calendar view, the item modification platform can generate items within cells associated with corresponding times or dates according to the calendar view. By doing so, the item modification platform enables the user interface to flexibly display blocks (e.g., events, tasks, files, or pages) according to user- or workspace-defined preferences.

In some implementations, the item modification platform generates a superordinate block item for display on the user interface based on an associated view type. For example, the item modification platform determines, based on the inheritance, a display preference for the superordinate block item. The item modification platform can determine a second view type associated with the display preference. The item modification platform can generate the superordinate block item in accordance with the second view type. As an illustrative example, the item modification platform can generate a block superordinate to the first block based on another view type associated with the superordinate block. By doing so, the item modification platform enables improved flexibility over the display of items according to their hierarchical status.

In some implementations, the item modification platform generates the block according to attributes associated with the block that are consistent with the preferences. For example, the item modification platform receives, from the server system, the attribute data, where the attribute data includes, for the first block item, a first attribute comprising an indication of at least one of a first user permission, a first modification ruleset, or a first display preference and where the attribute data includes, for the subordinate block item, a second attribute comprising an indication of at least one of a second user permission, a second modification ruleset, or a second display preference. The item modification platform can generate, for display on the user interface, the first block item according to the first attribute and the subordinate block item according to the second attribute. As an illustrative example, the item modification platform enables generation of the item on the user interface according to attributes that are consistent with the item and the associated preferences (e.g., associated with modification, inheritance, display, or access controls). By doing so, the item modification platform ensures the display of items according to the hierarchical information associated with relations between items.

In some implementations, the item modification platform generates the block on the user interface as an in-page object. For example, the item modification platform determines a view type consistent with the first request. The item modification platform can determine a first position for the first block item, where the first position indicates coordinates for displaying the first block item on the user interface and where the first position is consistent with the view type. The item modification platform can determine a second position for the subordinate block item, where the second position indicates coordinates for displaying the subordinate block item on the user interface. The item modification platform can generate, at the first position on the user interface, a first in-page object associated with the first block item. The item modification platform can generate, at the second position on the user interface, a second in-page object associated with the subordinate block item. As an illustrative example, the item modification platform can generate the item as in-page items within the user interface (e.g., with attributes displayed as embedded within associated pages within the user interface), thereby improving the accessibility of the information as displayed to users of the workspace.

Process for Modifying Hierarchical Information According to Type-Specific Preferences FIG. 11 is a flowchart 1100 illustrating a process for modifying hierarchical information associated with block items based on type-specific preferences. For example, the item modification platform enables movement of items from a first block to a second block according to the type of block between which the items are to be moved. By doing so, the item modification platform enables improved flexibility over the modification of items controlled by hierarchical structures within the user interface.

At operation 1102, the item modification platform can receive a request to de-link a first block from a second block and link the first block to a third block. For example, the item modification platform receives, via a user interface presented on a client device, a relation modification request for de-linking a first block item of a first type from a second block item of a second type and linking the first block item to a third block item of the second type. As an illustrative example, the item modification platform can receive a request to move a first task from a first page to a second page. By receiving such information, the item modification platform can determine how to handle this reconfiguration of the item on the basis of the type of blocks involved in the modification.

In some implementations, the modification request includes a command to move an item from a first page to a second page. For example, the first block item is embedded as an in-page object of a first page corresponding to the second block item and wherein the third block item corresponds to a second page. As an illustrative example, the first block can include an event, task, or file that is embedded within a first page, where the request is such that this event, task, or file is to be moved to a second page (e.g., to a second item corresponding to a page-type block).

At operation 1104, the item modification platform can query a server system for information relating to displayed block items in the associated workspace. For example, the item modification platform queries the system for configuration information relating to displayed block items presented in a first workspace associated with the user interface, where the displayed block items are associated with the first block item. As an illustrative example, the item modification platform can request information associated with preferences for the movement of items between different pages. By doing so, the item modification platform ensures that any modifications to the workspace are consistent with type-specific rules for reconfiguring such items, thereby preserving any hierarchical information and privacy controls associated with the workspace.

At operation 1106, the item modification platform can obtain a configuration for the first block item that includes type-specific inheritance preferences. For example, the item modification platform obtains, in response to the query, a configuration for the first block item, where the configuration includes a type-specific inheritance preference associated with the first block item and where the type-specific inheritance preference comprises a protocol for determining properties of the first block item that are inherited from properties of the third block item and for determining properties of the first block item that are retained from properties of the second block item. As an illustrative example, the item modification platform can obtain these preferences, such that the preferences are type-specific (e.g., dependent on the type of blocks between which the item is to be moved). For example, the preferences can include different rules for whether subordinate items are to be transferred between blocks based on whether these blocks are pages, events, tasks, or files. As such, the item modification platform enables improved flexibility with respect to reconfiguring or modifying items in a type-dependent manner, thereby conferring improved predictability with respect to modifications of items within the workspace.

At operation 1108, the item modification platform can determine that the second block and the third block are of the second type. For example, the item modification platform determines that the second block item and the third block item are of the second type. As an illustrative example, the item modification platform can determine that the user of the user interface is requesting to move a task from a first page to a second page; based on this determination, the item modification platform can determine the second type to include a page. By determining the type of block associated with the reconfiguration request, the item modification platform can ensure that the relevant preferences for the reconfiguration are adhered to, thereby improving the predictability of modifications of items associated with the user interface.

In some implementations, the item modification platform can determine the block types based on a block database. For example, the item modification platform determines, based on a block database associated with the first workspace, that a first attribute for the second block item and a second attribute for the third block item include an indication of the second type, where the indication of the second type includes an indication of one of a page, a task, an event, or a file. As an illustrative example, the item can determine the block types based on querying a block database (e.g., as associated with a server system) to ensure that block types are consistent with those defined globally.

At operation 1110, the item modification platform can generate attribute data based on the types associated with the second and third blocks. For example, in response to determining that the second block item and the third block item are of the second type, the item modification platform generates attribute data, for the first block item and each subordinate block item of the first block item, according to the type-specific inheritance preference. As an illustrative example, the item modification platform can determine attributes of the item to be moved based on whether such attributes are to be retained from the second block item (e.g., a first page from which the item is to be moved) and whether such attributes are to be inherited from the third block item (e.g., a second page to which the item is to be moved). By doing so, the item modification platform can ensure that the item exhibits any attributes as consistent with the type-specific preferences, thereby ensuring the predicted handling of modification requests associated with modifications to items within the workspace. As such, the item modification platform can ensure the consistency of hierarchical information associated with the workspace, thereby improving the modularity, flexibility, and consistency of the workspace and any associated displayed information.

In some implementations, the item modification platform determines attributes for the blocks based on associated properties. For example, the item modification platform determines, based on the configuration, a first property of the first block item that is retained from the second block item. The item modification platform can determine a first attribute of the second block item, where the first attribute is associated with the first property. The item modification platform can generate the attribute data for the first block item to include the first attribute. As an illustrative example, the item modification platform can determine an attribute associated with the first block item based on a property that is to be retained from the first page (e.g., the block from which the item is to be moved), thereby ensuring consistency with any type-specific modification preferences.

In some implementations, the first attribute includes one of a title, tag, timestamp, description, file, or item. For example, the first attribute can include text strings, values, timestamps, or other information associated with properties of the associated item, thereby ensuring that the display provides any suitable information to users of the user interface.

In some implementations, the item modification platform determines attributes associated with the second page (e.g., the third item) to apply to the first block. For example, the item modification platform determines, based on the configuration, a first property of the first block item that is inherited from the third block item. The item modification platform can determine a first attribute of the third block item, where the first attribute is associated with the first property. The item modification platform can generate the attribute data for the first block item to include the first attribute. As an illustrative example, the item modification platform can determine an attribute associated with the first block item based on a property that is to be inherited from the second page (e.g., the block to which the item is to be moved), thereby ensuring consistency with any type-specific modification preferences.

At operation 1112, the item modification platform can cause the user interface to display the first block linked with the third block, according to the attribute data. For example, the item modification platform causes the user interface to display the first block item linked with the third block item according to the attribute data. As an illustrative example, the item modification platform can cause the user interface to display the first block item to show an explicit link with the page or item to which the first block item is to be moved. For example, the first block item can be shown as a component of the third block item in a graphical manner (e.g., as embedded within a graphical representation of the third block item).

In some implementations, the item modification platform enables a display of the first block as embedded within a page. For example, the item modification platform determines that the second type corresponds to a page type. Based on determining that the second type corresponds to the page type, the item modification platform can cause the user interface to display the first block item as an in-page object of a page corresponding to the third block item. For example, the item modification platform can determine that the block to which the first block item is moved corresponds to a page; based on this determination, the item modification platform can display the block item as an embedded object within the page, consistent with any associated type-specific preferences.

In some implementations, the item modification platform removes the first block from the first page (e.g., thereby de-linking the block from the page, consistent with the first request). For example, the item modification platform causes the system to cause the user interface not to display the first block item as an object of a page corresponding to the second block item. As an illustrative example, the item modification platform can remove an embedded representation of the item from the page from which the item is to be moved, thereby de-linking the item from the item entirely, consistent with the relation modification request.

Computer System

Figure 12:
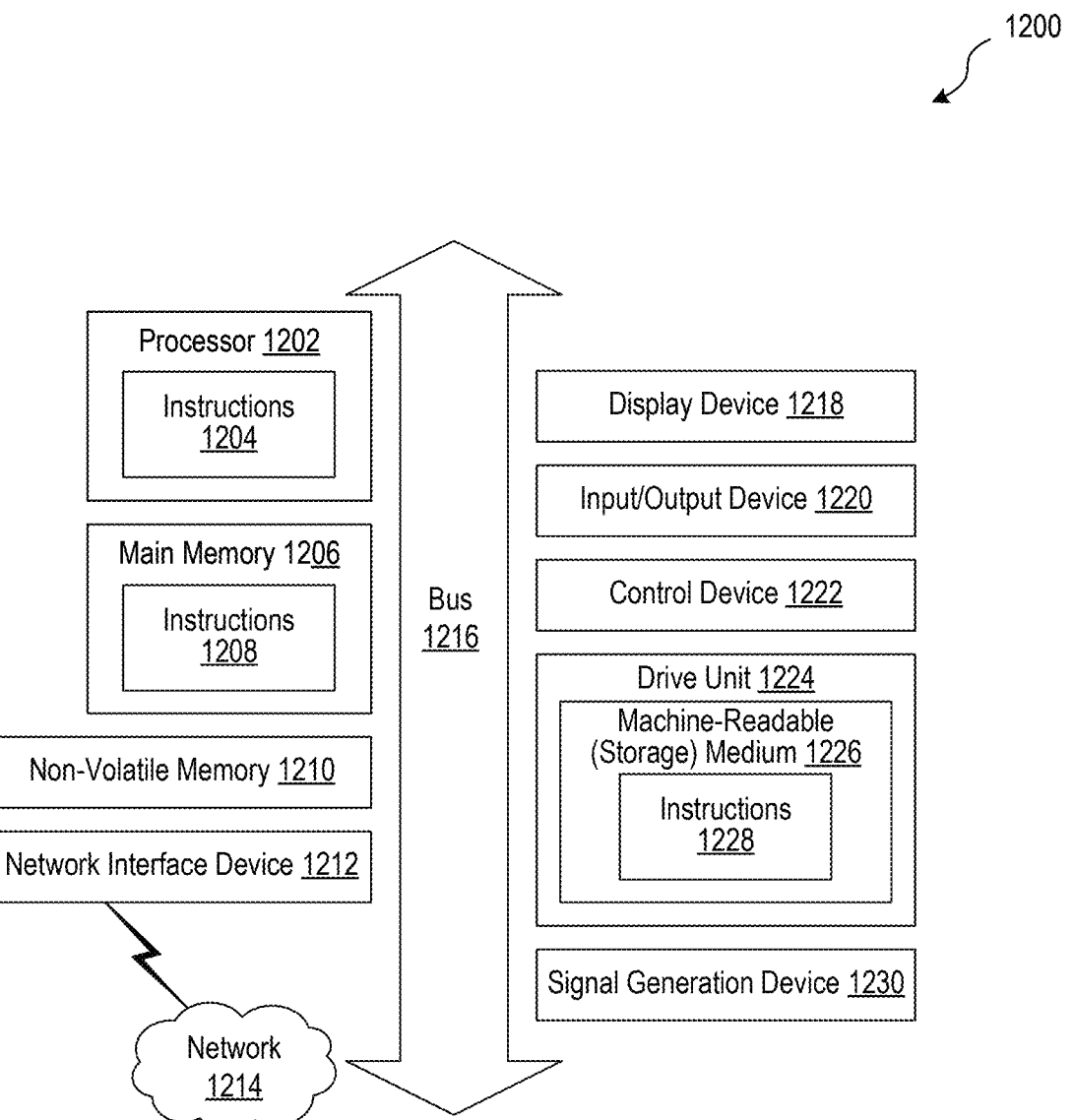
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include one or more processors 1202, main memory 1206, non-volatile memory 1210, a network interface device 1212, a display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computer system 1200 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1200. In some implementations, the computer system 1200 can be an embedded computer system, a system-on-chip (SOC), a single-board computer (SBC) system, or a distributed system such as a mesh of computer systems or include one or more cloud components in one or more networks. Where appropriate, one or more computer systems 1200 can perform operations in real time, near real time, or batch mode.

The network interface device 1212 enables the computer system 1200 to mediate data in a network 1214 with an entity that is external to the computer system 1200 through any communication protocol supported by the computer system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable medium 1226 can include any medium that is capable of storing, encoding, or carrying a set of instructions for execution by the computer system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computer system 1200 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variant thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to:

receive, via a client device for a first user, a request to modify a first block item that is embedded as an in-page object on a page of a first workspace, wherein the request includes an instruction to duplicate, delete, or reconfigure the first block item;

in response to the request being received, query the system for information of displayed block items presented on a user interface of the client device, wherein the displayed block items are included in a hierarchical structure that is presented on the user interface of the client device, and wherein the displayed block items have hierarchical relationships with non-displayed block items that are not included in the hierarchical structure;

receive a set of identifiers of the displayed block items, relational information that indicates hierarchical relationships among the displayed block items, and privacy information that includes access permissions information for the displayed block items;

determine, based on the relational information, an indication of displayed subordinate block items associated with the first block item and presented on the user interface of the client device in the hierarchical structure;

use the indication of displayed subordinate block items to query a block database to obtain non-displayed subordinate block items for the first block item, wherein the non-displayed subordinate block items have hierarchical relationships with the first block but are not included in the hierarchical structure;

modify the block database by applying the instruction to the first block item and propagating the corresponding modifications to the displayed subordinate block items and the non-displayed subordinate block items based on hierarchical relationships with the first block item, wherein the instructions for modifying the block database in accordance with the instruction cause the system to:

determine that the request includes the instruction to duplicate the first block item;

in response to determining that the request includes the instruction to duplicate the first block item, generate:

(1) a second block item identical to the first block item, (2) a second set of non-displayed subordinate block items identical to the non-displayed subordinate block items, (3) a second set of displayed subordinate block items identical to the displayed subordinate block items, and (4) a second hierarchical structure identical to the hierarchical structure including the second set of displayed subordinate block items and not including the second set of non-displayed block items in the hierarchical structure;

generate second relational information, wherein the second relational information includes an indication that the second set of displayed subordinate block items and the second set of non-displayed subordinate block items are subordinate to the second block item; and store, in the block database:

(1) the second block item, (2) the second set of non-displayed subordinate block items, (3) the second set of displayed subordinate block items, and (4) a representation of the second relational information;

determine, using the modified block database, updated displayed block items; and communicate an indication of the updated displayed block items to the client device, wherein the indication of the updated displayed block items includes modified relational and privacy information associated with the updated displayed block items.

2. The non-transitory, computer-readable storage medium of claim 1, wherein the instructions for communicating the indication of the updated displayed block items cause the system to:

determine, using the modified block database, block items comprising (1) the first block item, (2) the displayed subordinate block items, (3) the second block item, and (4) the second set of displayed subordinate block items; and communicate an indication of the block items to the client device.

3. The non-transitory, computer-readable storage medium of claim 1, wherein the instructions for modifying the block database in accordance with the instruction cause the system to:

determine that the request includes the instruction to delete the first block item; and in response to determining that the request includes the instruction to delete the first block item, modify the block database to remove (1) the first block item, (2) the displayed subordinate block items, and (3) the non-displayed subordinate block items.

4. The non-transitory, computer-readable storage medium of claim 1, wherein the instructions for modifying the block database in accordance with the instruction cause the system to:

determine that the request includes the instruction to reconfigure the first block item, wherein the instruction to reconfigure the first block item comprises a request to link the first block item with a first superordinate block item;

in response to determining that the request includes the instruction to reconfigure the first block item, generate additional relational information comprising a hierarchical relationship between the first superordinate block item and the first block item, wherein the hierarchical relationship indicates that the first superordinate block item is superordinate to the first block item; and modify the block database to include the additional information.

5. The non-transitory, computer-readable storage medium of claim 4, wherein the instructions for communicating the indication of the updated displayed block items to the client device cause the system to:

determine, using the modified block database and the additional relational information, block items comprising (1) the first block item, (2) the displayed subordinate block items, and (3) the first superordinate block item; and communicate an indication of the block items to the client device.

6. The non-transitory, computer-readable storage medium of claim 1, wherein the instructions for modifying the block database in accordance with the instruction cause the system to:

determine that the request includes the instruction to reconfigure the first block item, wherein the instruction to reconfigure the first block item comprises a request to de-link the first block item from a first superordinate block item;

in response to determining that the request includes the instruction to reconfigure the first block item, modify the relational information to remove a hierarchical relationship between the first superordinate block item and the first block item, wherein the hierarchical relationship indicates that the first superordinate block item is not superordinate to the first block item; and modify the block database to include the modified relational information.

7. The non-transitory, computer-readable storage medium of claim 1, wherein the instructions for communicating the indication of the updated displayed block items to the client device cause the system to:

determine, using the modified block database, a view type associated with the updated displayed block items, wherein the view type includes one of a table, a list, a board, a timeline, a gallery, or a calendar; and communicate the indication of the updated displayed block items to include the view type.

8. The non-transitory, computer-readable storage medium of claim 1, wherein the instructions for communicating the indication of the updated displayed block items to the client device cause the system to:

determine, using the modified block database, an indication of the page associated with the first block item; and communicate the indication of the page to the client device to cause the user interface to display the updated displayed block items embedded as the in-page object of the page.

9. A system comprising:

at least one hardware processor; and at least one non-transitory memory storing instructions, which, when executed by the at least one hardware processor, cause the system to:

receive, via a client device for a first user, a request to modify a first block item that is embedded as an in-page object on a page of a first workspace, wherein the request includes an instruction to duplicate, delete, or reconfigure the first block item;

in response to the request being received, query the system for information of displayed block items presented on a user interface of the client device, wherein the displayed block items are included in a hierarchical structure presented on a user interface of the client device, and wherein the displayed block items have hierarchical relationships with non-displayed block items that are not included in the hierarchical structure;

receive a set of identifiers of the displayed block items, relational information that indicates hierarchical relationships among the displayed block items, and privacy information that includes access permissions information for the displayed block items;

determine, based on the relational information, an indication of displayed subordinate block items associated with the first block item and presented on the user interface of the client device in the hierarchical structure;

use the indication of displayed subordinate block items to query a block database to obtain non-displayed subordinate block items for the first block item, wherein the non-displayed subordinate block items have hierarchical relationships with the first block but are not included in the hierarchical structure;

modify the block database by applying the instruction to the first block item and propagating the corresponding modifications to the displayed subordinate block items and the non-displayed subordinate block items based on hierarchical relationships with the first block item, wherein the instructions for modifying the block database in accordance with the instruction cause the system to:

determine that the request includes the instruction to duplicate the first block item;

in response to determining that the request includes the instruction to duplicate the first block item, generate:

(1) a second block item identical to the first block item, (2) a second set of non-displayed subordinate block items identical to the non-displayed subordinate block items, (3) a second set of displayed subordinate block items identical to the displayed subordinate block items, and (4) a second hierarchical structure identical to the hierarchical structure including the second set of displayed subordinate block items and not including the second set of non-displayed block items in the hierarchical structure;

generate second relational information, wherein the second relational information includes an indication that the second set of displayed subordinate block items and the second set of non-displayed subordinate block items are subordinate to the second block item; and store, in the block database:

(1) the second block item, (2) the second set of non-displayed subordinate block items, (3) the second set of displayed subordinate block items, and (4) a representation of the second relational information;

determine, using the modified block database, updated displayed block items; and communicate an indication of the updated displayed block items to the client device, wherein the indication of the updated displayed block items includes modified relational and privacy information associated with the updated displayed block items.

10. The system of claim 9, wherein the instructions for communicating the indication of the updated displayed block items cause the system to:

determine, using the modified block database, block items comprising (1) the first block item, (2) the displayed subordinate block items, (3) the second block item, and (4) the second set of displayed subordinate block items; and communicate an indication of the block items to the client device.

11. The system of claim 9, wherein the instructions for modifying the block database in accordance with the instruction cause the system to:

determine that the request includes the instruction to delete the first block item; and in response to determining that the request includes the instruction to delete the first block item, modify the block database to remove (1) the first block item, (2) the displayed subordinate block items, and (3) the non-displayed subordinate block items.

12. The system of claim 9, wherein the instructions for modifying the block database in accordance with the instruction cause the system to:

determine that the request includes the instruction to reconfigure the first block item, wherein the instruction to reconfigure the first block item comprises a request to link the first block item with a first superordinate block item;

in response to determining that the request includes the instruction to reconfigure the first block item, generate additional relational information comprising a hierarchical relationship between the first superordinate block item and the first block item, wherein the hierarchical relationship indicates that the first superordinate block item is superordinate to the first block item; and modify the block database to include the additional relational information.

13. The system of claim 12, wherein the instructions for communicating the indication of the updated displayed block items to the client device cause the system to:

determine, using the modified block database and the additional relational information, block items comprising (1) the first block item, (2) the displayed subordinate block items, and (3) the first superordinate block item; and communicate an indication of the block items to the client device.

14. A method comprising:

receiving, via a client device for a first user, a request to modify a first block item that is embedded as an in-page object on a page of a first workspace, wherein the request includes an instruction to duplicate, delete, or reconfigure the first block item;

in response to the request being received, querying a workspace administration system for information of displayed block items presented on a user interface of the client device, wherein the displayed block items are included in a hierarchical structure presented on a user interface of the client device, and wherein the displayed block items have hierarchical relationships with non-displayed block items that are not included in the hierarchical structure;

receiving a set of identifiers of the displayed block items, relational information that indicates hierarchical relationships among the displayed block items, and privacy information that includes access permissions information for the displayed block items;

determining, based on the relational information, an indication of displayed subordinate block items associated with the first block item and presented on the user interface of the client device in the hierarchical structure;

using the indication of displayed subordinate block items to query a block database to obtain non-displayed subordinate block items for the first block item, wherein the non-displayed subordinate block items have hierarchical relationships with the first block but are not included in the hierarchical structure;

modifying the block database by applying the instruction to the first block item and propagating the corresponding modifications to the displayed subordinate block items and the non-displayed subordinate block items based on hierarchical relationships with the first block item, wherein modifying the block database in accordance with the instruction comprises:

determining that the request includes the instruction to duplicate the first block item;

in response to determining that the request includes the instruction to duplicate the first block item, generating:

(1) a second block item identical to the first block item, (2) a second set of non-displayed subordinate block items identical to the non-displayed subordinate block items, (3) a second set of displayed subordinate block items identical to the displayed subordinate block items, and (4) a second hierarchical structure identical to the hierarchical structure including the second set of displayed subordinate block items and not including the second set of non-displayed block items in the hierarchical structure;

generating second relational information, wherein the second relational information includes an indication that the second set of displayed subordinate block items and the second set of non-displayed subordinate block items are subordinate to the second block item; and storing, in the block database:

(1) the second block item, (2) the second set of non-displayed subordinate block items, (3) the second set of displayed subordinate block items, and (4) a representation of the second relational information;

determining, using the modified block database, updated displayed block items; and communicating an indication of the updated displayed block items to the client device, wherein the indication of the updated displayed block items includes modified relational and privacy information associated with the updated displayed block items.

15. The method of claim 14, wherein communicating the indication of the updated displayed block items comprises:

determining, using the modified block database, block items comprising (1) the first block item, (2) the displayed subordinate block items, (3) the second block item, and (4) the second set of displayed subordinate block items; and communicating an indication of the block items to the client device.

16. The method of claim 14, wherein the instructions for modifying the block database in accordance with the instruction comprise:

determining that the request includes the instruction to delete the first block item; and in response to determining that the request includes the instruction to delete the first block item, modifying the block database to remove (1) the first block item, (2) the displayed subordinate block items, and (3) the non-displayed subordinate block items.

17. The method of claim 14, wherein modifying the block database in accordance with the instruction comprises:

determining that the request includes the instruction to reconfigure the first block item, wherein the instruction to reconfigure the first block item comprises a request to link the first block item with a first superordinate block item;

in response to determining that the request includes the instruction to reconfigure the first block item, generating additional relational information comprising a hierarchical relationship between the first superordinate block item and the first block item, wherein the hierarchical relationship indicates that the first superordinate block item is superordinate to the first block item; and modifying the block database to include the additional relational information.

\* \* \* \* \*